US012610355B2

(12) United States Patent (10) Patent No.: US 12,610,355 B2
Zhang et al. (45) Date of Patent: Apr. 21, 2026

(54) RESOURCE ALLOCATION METHOD, DEVICE, AND STORAGE MEDIUM

(71) Applicant: Huawei Technologies Co., Ltd., Shenzhen (CN)

(72) Inventors: Shuaishuai Zhang, Nanjing (CN); Chun Pan, Nanjing (CN); Weixi Chen, Nanjing (CN); Xingfeng Jiang, Nanjing (CN); Rihai Wu, Suzhou (CN); Hongyi Tan, Suzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 392 days.

(21) Appl. No.: 18/315,270

(22) Filed: May 10, 2023

(65) Prior Publication Data

US 2023/0371013 A1      Nov. 16, 2023

(30) Foreign Application Priority Data

May 11, 2022   (CN) .......................... 202210510359.8
Jul. 6, 2022   (CN) .......................... 202210799233.7

(51) Int. Cl.
| | |
|---|---|
| *H04W 72/0453* | (2023.01) |
| *H04B 17/318* | (2015.01) |
| *H04W 24/10* | (2009.01) |
| *H04W 72/0446* | (2023.01) |
| *H04W 84/12* | (2009.01) |

(52) U.S. Cl.
CPC ...... *H04W 72/0453* (2013.01); *H04B 17/328* (2023.05); *H04W 24/10* (2013.01); *H04W 72/0446* (2013.01); *H04W 84/12* (2013.01)

(58) Field of Classification Search
CPC ... H04W 72/541; H04W 72/12; H04W 24/10; H04W 72/0453; H04W 72/0446; H04W 72/21; H04W 84/12; H04W 72/04; H04W 16/10; H04B 17/328
See application file for complete search history.

(56) References Cited

U.S. PATENT DOCUMENTS

| | | | |
|---|---|---|---|
| 2011/0319066 A1* | 12/2011 | Chou .................... | H04W 88/04 |
| | | | 455/422.1 |
| 2019/0320325 A1* | 10/2019 | Halabian ............... | H04W 16/18 |
| 2019/0320332 A1* | 10/2019 | Halabian .............. | H04W 16/18 |
| 2022/0377679 A1* | 11/2022 | Hathi .................. | H04W 52/367 |

(Continued)

OTHER PUBLICATIONS

IEEE P802.11ax/D8.0, "Draft Standard for Information technology—Telecommunications and information exchange between systems Local and metropolitan area networks—Specific requirements. Part 11: Wireless LAN Medium Access Control (MAC) and Physical Layer (PHY) Specifications. Amendment 1: Enhancements for High Efficiency WLAN", IEEE P802.11ax/D8.0, Oct. 2020, total 820 pages.

*Primary Examiner* — Brian D Nguyen
(74) *Attorney, Agent, or Firm* — Slater Matsil, LLP

(57) ABSTRACT

A resource allocation method, a device, and a storage medium are disclosed. The method includes: A network device obtains a packet concurrency status of a plurality of wireless local area network WLAN devices, where the plurality of WLAN devices correspond to a same channel. The network device allocates channel resource slices to the plurality of WLAN devices from a channel resource in a first time period based on the packet concurrency status.

20 Claims, 7 Drawing Sheets

A network device obtains a packet concurrency status of a plurality of WLAN devices, where the plurality of WLAN devices correspond to a same channel — 501

The network device allocates channel resource slices to the plurality of WLAN devices from a channel resource in a first time period based on the packet concurrency status of the plurality of WLAN devices — 502

(56) References Cited

U.S. PATENT DOCUMENTS

| | | | | |
|---|---|---|---|---|
| 2023/0062010 A1* | 3/2023 | Malboubi | ............. | H04W 24/08 |
| 2023/0073742 A1* | 3/2023 | Saini | ................. | H04W 28/0289 |
| 2023/0099849 A1* | 3/2023 | Bai | ....................... | H04W 72/23 |
| | | | | 370/329 |
| 2023/0114391 A1* | 4/2023 | Chen | .................... | H04W 24/08 |
| | | | | 370/252 |
| 2023/0239352 A1* | 7/2023 | Thubert | ................. | H04L 67/12 |
| | | | | 370/254 |
| 2023/0292248 A1* | 9/2023 | Akhtar | ............. | H04W 52/0245 |
| 2024/0163058 A1* | 5/2024 | Taghizadeh Motlagh | .................. | |
| | | | | H04L 5/0051 |
| 2024/0188074 A1* | 6/2024 | Löhr | ................ | H04W 72/1268 |

* cited by examiner

A network device obtains a packet concurrency status of a plurality of WLAN devices, where the plurality of WLAN devices correspond to a same channel                501

The network device allocates channel resource slices to the plurality of WLAN devices from a channel resource in a first time period based on the packet concurrency status of the plurality of WLAN devices                502

RESOURCE ALLOCATION METHOD, DEVICE, AND STORAGE MEDIUM

CROSS-REFERENCE TO RELATED APPLICATION

This application claims priority to Chinese Patent Application No. 202210510359.8, filed on May 11, 2022, and Chinese Patent Application No. 202210799233.7, filed on Jul. 6, 2022. The afore-mentioned patent applications are hereby incorporated by reference in their entireties.

TECHNICAL FIELD

This application relates to the field of communication technologies, and in particular, to a resource allocation method and apparatus, a device, a storage medium, and a computer program.

BACKGROUND

When a wireless local area network (Wireless Local Area Network, WLAN) needs to be deployed in an area, a plurality of access points (Access Point, AP) are usually deployed in the area, and a corresponding channel is configured for each AP. In this way, stations (station, STA) in the area can be associated with these APs, to send packets through the channels corresponding to these APs. However, when one AP is associated with a large quantity of STAs, a channel resource needs to be allocated to avoid a conflict.

When a packet is sent through orthogonal frequency division multiple access (Orthogonal Frequency Division Multiple Access, OFDMA), resources of an entire channel are first divided into a plurality of orthogonal and non-overlapping resource units (Resource Unit, RU), and then an RU is allocated to each STA, where RUs allocated to different STAs do not overlap each other. In this way, each STA can send a packet through an RU allocated to the STA. In other words, when a plurality of STAs are associated with a same AP, the plurality of STAs can simultaneously access a channel through OFDMA to send packets.

However, when a plurality of APs correspond to a same channel (also referred to as co-channel APs), the channel may be occupied by an AP, and cannot be accessed by another AP. In this case, a STA associated with the another AP cannot access the channel. Even an OFDMA manner can only ensure that STAs associated with the AP that accesses the channel send packets at a same moment.

SUMMARY

This application provides a resource allocation method and apparatus, a device, a storage medium, and a computer program, to resolve a problem that a STA cannot access a channel in a timely manner in a related technology. The technical solutions are as follows:

According to a first aspect, a resource allocation method is provided. In the method, a network device obtains a packet concurrency status of a plurality of wireless local area network WLAN devices, where the plurality of WLAN devices correspond to a same channel. The network device allocates channel resource slices to the plurality of WLAN devices from a channel resource in a first time period based on the packet concurrency status. The plurality of WLAN devices include a first WLAN device and a second WLAN device, the first WLAN device and the second WLAN device are associated with different WLAN devices, the packet concurrency status indicates that the first WLAN device and the second WLAN device can perform packet concurrency, and channel resource slices allocated to the first WLAN device and the second WLAN device are the same.

The plurality of WLAN devices are a plurality of STAs, the plurality of STAs are associated with at least two APs, and the at least two APs correspond to a same channel. That is, the at least two APs are co-channel APs, and the plurality of STAs are STAs associated with the co-channel APs. The packet concurrency status of the plurality of WLAN devices refers to whether the plurality of WLAN devices can simultaneously send and/or receive packets.

There are a plurality of implementations in which the network device obtains the packet concurrency status of the plurality of WLAN devices. The following describes three of the implementations. For ease of understanding, the plurality of WLAN devices are directly referred to as STAs, and WLAN devices associated with the plurality of WLAN devices are directly referred to as APs in the following, to describe determining the packet concurrency status of the plurality of STAs.

In a first implementation, the network device obtains decision-making region information. The decision-making region information indicates a status of mutual sensing between every two WLAN devices in the plurality of WLAN devices and WLAN devices associated with the plurality of WLAN devices. The network device determines the packet concurrency status of the plurality of WLAN devices based on the decision-making region information.

The at least two APs associated with the plurality of STAs each determine a plurality of sensing statuses. The plurality of sensing statuses include sensing statuses of the AP for other devices, and sensing statuses of the STAs associated with the AP for other devices. The at least two APs each send the plurality of determined sensing statuses to the network device. In this way, the network device can receive the plurality of sensing statuses, and determine the decision domain information based on the plurality of sensing statuses.

If none of a first AP and a second AP, the first AP and a second STA, a first STA and the second AP, and the first STA and the second STA can sense each other, it is determined that the first STA and the second STA can perform packet concurrency. If not all of the first AP and the second AP, the first AP and the second STA, the first STA and the second AP, and the first STA and the second STA can sense each other, it is determined that the first STA and the second STA cannot perform packet concurrency. The first STA is associated with the first AP, the second STA is associated with the second AP, and the first STA and the second STA are any two STAs in the plurality of STAs. The packet concurrency status also needs to be determined for another STA in the plurality of STAs in this manner. In this way, the packet concurrency status of the plurality of STAs can be obtained. In this way, the network device only needs to determine a status of mutual sensing between every two WLAN devices in the plurality of WLAN devices and the WLAN devices associated with the plurality of WLAN devices, to determine the packet concurrency status of the plurality of WLAN devices, so as to reduce a calculation amount of the network device.

It should be noted that, when any two devices in the plurality of STAs and the at least two APs associated with the plurality of STAs cannot sense each other, the network device directly determines that the plurality of STAs can perform packet concurrency.

In a second implementation, the network device obtains a packet measurement result. The packet measurement result includes strengths of signals that can be received between every two WLAN devices in the plurality of WLAN devices and the WLAN devices associated with the plurality of WLAN devices. The network device determines the packet concurrency status of the plurality of WLAN devices based on the obtained packet measurement result.

The at least two APs associated with the plurality of STAs each determine a plurality of signal strengths. The plurality of signal strengths include a strength of a signal sent by another device and received by the AP, and a strength of a signal sent by another device and received by each STA associated with the AP. The at least two APs each send the plurality of determined signal strengths to the network device. In this way, the network device can obtain the packet measurement result.

A STA can receive a packet sent by an AP, and can also send a packet to an AP. The packet sent by the AP to the STA is referred to as a downlink packet, and the packet sent by the STA to the AP is referred to as an uplink packet. In addition, based on the foregoing description, the packet concurrency status of the plurality of STAs indicates whether the plurality of STAs can simultaneously send and/or receive packets. Therefore, the packet concurrency status of the plurality of STAs may be classified into an uplink packet concurrency status, a downlink packet concurrency status, and an uplink and downlink packet concurrency status. The following separately describes processes of determining the three types of packet concurrency statuses.

First type: The packet concurrency status of the plurality of STAs is an uplink and downlink packet concurrency status. In this case, the network device determines differences between a first signal strength and each of a second signal strength and a third signal strength. The first signal strength is a strength of a signal sent by the first AP and received by the first STA, the second signal strength is a strength of a signal sent by the second AP and received by the first STA, and the third signal strength is a strength of a signal sent by the second STA and received by the first STA. The network device determines differences between a fourth signal strength and each of a fifth signal strength and a sixth signal strength. The fourth signal strength is a strength of a signal sent by the first STA and received by the first AP, the fifth signal strength is a strength of a signal sent by the second AP and received by the first AP, and the sixth signal strength is a strength of a signal sent by the second STA and received by the first AP. The network device determines differences between a seventh signal strength and each of an eighth signal strength and a ninth signal strength. The seventh signal strength is a strength of a signal sent by the second AP and received by the second STA, the eighth signal strength is a strength of a signal sent by the first AP and received by the second STA, and the ninth signal strength is a strength of a signal sent by the first STA and received by the second STA. The network device determines differences between a tenth signal strength and each of an eleventh signal strength and a twelfth signal strength. The tenth signal strength is a strength of a signal sent by the second STA and received by the second AP, the eleventh signal strength is a strength of a signal sent by the first AP and received by the second AP, and the twelfth signal strength is a strength of a signal sent by the first STA and received by the second AP. The eight differences are obtained through the foregoing process. If all the eight differences are greater than or equal to a reference signal interference, it is determined that the first STA and the second STA can perform uplink and downlink packet concurrency. If not all the eight differences are greater than or equal to the reference signal interference, it is determined that the first STA and the second STA cannot perform uplink and downlink packet concurrency. The first STA is associated with the first AP, the second STA is associated with the second AP, and the first STA and the second STA are any two STAs in the plurality of STAs. The packet concurrency status also needs to be determined for another STA in the plurality of STAs in this manner. In this way, the uplink and downlink packet concurrency status of the plurality of STAs can be obtained. In this way, the network device can accurately calculate whether there are STAs that can perform uplink and downlink packet concurrency in the plurality of STAs.

For a STA and an AP, power for sending an uplink measurement packet by the STA may be the same as or different from power for sending a downlink measurement packet by the AP. When the power for sending the uplink measurement packet by the STA is the same as the power for sending the downlink measurement packet by the AP, a signal strength of the downlink measurement packet sent by the AP and received by the STA is the same as a signal strength of the uplink measurement packet sent by the STA and received by the AP. When the power for sending the uplink measurement packet by the STA is different from the power for sending the downlink measurement packet by the AP, a signal strength of the downlink measurement packet sent by the AP and received by the STA is different from a signal strength of the uplink measurement packet sent by the STA and received by the AP.

If power for sending an uplink measurement packet by the first STA is the same as power for sending a downlink measurement packet by the first AP, the strength of the signal sent by the first AP and received by the first STA is the same as the strength of the signal sent by the first STA and received by the first AP. In this case, the first signal strength is the same as the fourth signal strength. Similarly, if power for sending an uplink measurement packet by the first STA is the same as power for sending a downlink measurement packet by the second AP, the second signal strength is the same as the twelfth signal strength. If power for sending an uplink measurement packet by the first STA is the same as power for sending an uplink measurement packet by the second STA, the third signal strength is the same as the ninth signal strength. If power for sending a downlink measurement packet by the first AP is the same as power for sending an uplink measurement packet by the second AP, the fifth signal strength is the same as the eleventh signal strength. If power for sending a downlink measurement packet by the first AP is the same as power for sending an uplink measurement packet by the second STA, the sixth signal strength is the same as the eighth signal strength. If power for sending a downlink measurement packet by the second AP is the same as power for sending an uplink measurement packet by the second STA, the seventh signal strength is the same as the tenth signal strength.

Second type: The packet concurrency status of the plurality of STAs is an uplink packet concurrency status. In this case, the network device determines differences between the fourth signal strength and each of the fifth signal strength and the sixth signal strength, and determines differences between the tenth signal strength and each of the eleventh signal strength and the twelfth signal strength, to obtain the four differences. If all the four differences are greater than or equal to the reference signal interference, it is determined that the first STA and the second STA can perform uplink packet concurrency. If not all the four differences are greater than or equal to the reference signal interference, it is determined that the first STA and the second STA cannot perform uplink packet concurrency. The uplink packet concurrency status also needs to be determined for another STA in the plurality of STAs in this manner. In this way, the uplink packet concurrency status of the plurality of STAs can be obtained. In this way, when only uplink packets need to be concurrently sent, the network device only needs to determine STAs that can perform uplink packet concurrency, to reduce a calculation amount of the network device.

Third type: The packet concurrency status of the plurality of STAs is a downlink packet concurrency status. In this case, the network device determines differences between the first signal strength and each of the second signal strength and the third signal strength, and determines differences between the seventh signal strength and each of the eighth signal strength and the ninth signal strength, to obtain the four differences. If all the four differences are greater than or equal to the reference signal interference, it is determined that the first STA and the second STA can perform downlink packet concurrency. If not all the four differences are greater than or equal to the reference signal interference, it is determined that the first STA and the second STA cannot perform downlink packet concurrency. The downlink packet concurrency status also needs to be determined for another STA in the plurality of STAs in this manner. In this way, the downlink packet concurrency status of the plurality of STAs can be obtained. In this way, when only downlink packets need to be concurrently sent, the network device only needs to determine STAs that can perform downlink packet concurrency, to reduce a calculation amount of the network device.

In a third implementation, the network device obtains decision-making region information and a packet measurement result, and determines the packet concurrency status of the plurality of WLAN devices based on the decision-making region information and the packet measurement result.

If none of the first AP and the second AP, the first AP and the second STA, the first STA and the second AP, and the first STA and the second STA can sense each other, it is determined that the first STA and the second STA can perform packet concurrency. If not all of the first AP and the second AP, the first AP and the second STA, the first STA and the second AP, and the first STA and the second STA can sense each other, the network device determines a packet concurrency status of the first STA and the second STA based on the packet measurement result.

In the foregoing method, some STAs that can perform packet concurrency are first determined based on the decision-making region information. For some STAs, whether the STAs can perform packet concurrency cannot be determined based on the decision-making region information, and needs to be determined again based on the packet measurement result, to determine whether the STAs can finally perform packet concurrency. Therefore, the method can further reduce a calculation amount of determining, by the network device, the packet concurrency status based on the packet measurement result, and can also avoid a problem that an error occurs when the packet concurrency status is determined based on only the decision-making region information. For example, STAs that can actually perform packet concurrency are determined as incapable of performing packet concurrency. In this way, accuracy of determining the packet concurrency status can be further improved.

The packet concurrency status indicates that the first WLAN device and the second WLAN device can perform packet concurrency, and it indicates that interference is minimum when the first WLAN device and the second WLAN device simultaneously send packets. Therefore, the network device allocates a same channel resource slice to the two WLAN devices from the channel resource in the first time period. In this way, when the two WLAN devices simultaneously send packets, no large interference is caused to each other, and packet transmission quality is not affected.

A channel resource slice is a partial channel resource allocated by the network device to a WLAN device from a channel resource, and the channel resource includes a frequency resource and/or a time resource. When the channel resource includes the frequency resource, the channel resource slice is a partial frequency resource allocated by the network device to the WLAN device from the frequency resource of the channel. When the channel resource includes the time resource, the channel resource slice is a partial time resource allocated by the network device to the WLAN device from the time resource of the channel.

Optionally, the plurality of WLAN devices further include a fifth WLAN device and a sixth WLAN device. The fifth WLAN device and the sixth WLAN device are associated with different WLAN devices. The packet concurrency status indicates that the fifth WLAN device and the sixth WLAN device cannot perform packet concurrency, and channel resource slices allocated to the fifth WLAN device and the sixth WLAN device are different.

The packet concurrency status indicates that the fifth WLAN device and the sixth WLAN device cannot perform packet concurrency, and it indicates that interference may be large when the fifth WLAN device and the sixth WLAN device simultaneously send packets. Therefore, the network device allocates different channel resource slices to the two WLAN devices from the channel resource in the first time period. In this way, when the two WLAN devices simultaneously send packets by using different channel resource slices, no large interference is caused to each other, and packet transmission quality is not affected.

The channel resource includes the frequency resource and/or the time resource. Therefore, the channel resource slices allocated by the network device to the plurality of WLAN devices from the channel resource in the first time period based on the packet concurrency status are frequency resource slices and/or time resource slices. In addition, because there may be a plurality of types of packet concurrency statuses of the plurality of WLAN devices, the network device may allocate the channel resource slices to the plurality of WLAN devices from the channel resource in the first time period in different manners. Even for a same packet concurrency status, the network device may also allocate the channel resource slices to the plurality of WLAN devices from the channel resource in the first time period in different manners. That is, there are a plurality of manners of allocating channel resource slices to the plurality of WLAN devices from the channel resource in the first time period based on the packet concurrency status. However, a fundamental objective is to allocate different channel resource slices to WLAN devices that cannot perform packet concurrency, so that the WLAN devices that cannot perform packet concurrency are isolated in time and/or frequency, to ensure packet transmission quality.

The following describes several channel resource division manners. However, the following several manners do not limit the channel resource division manner in this application.

In a first manner, a channel resource includes a time resource, time resource slices allocated to STAs that can perform packet concurrency are the same, time resource slices allocated to STAs that cannot perform packet concurrency are different, and time resource slices allocated to STAs that are associated with a same AP and that cannot perform packet concurrency are continuous.

In a second manner, a channel resource includes a time resource, time resource slices allocated to STAs that can perform packet concurrency are the same, time resource slices allocated to STAs that cannot perform packet concurrency are different, and time resource slices allocated to STAs that are associated with a same AP and that cannot perform packet concurrency are discontinuous.

In a third manner, a channel resource includes a time resource and a frequency resource, time resource slices and frequency resource slices allocated to STAs that can perform packet concurrency are the same, frequency resource slices allocated to STAs that are associated with a same AP and that cannot perform packet concurrency are different, and time resource slices allocated to STAs associated with a same AP are the same.

In a fourth manner, a channel resource includes a time resource and a frequency resource, time resource slices and frequency resource slices allocated to STAs that can perform packet concurrency are the same, time resource slices allocated to STAs that are associated with a same AP and that cannot perform packet concurrency are different, and frequency resource slices allocated to STAs associated with a same AP are the same.

In a fifth manner, a channel resource includes a time resource, and when STAs that can perform packet concurrency are associated with different APs, time resource slices allocated to the STAs that can perform packet concurrency are the same.

In a sixth manner, a channel resource includes a time resource and a frequency resource, and when STAs that can perform packet concurrency include one STA, time resource slices allocated to STAs associated with a same AP are different, and frequency resource slices allocated to STAs that are associated with different APs and that belong to a same time resource slice are different.

The foregoing content is that the network device allocates the channel resource slices to the plurality of WLAN devices from the channel resource in the first time period. In addition, channel resource slices allocated to WLAN devices that can perform packet concurrency in the first time period are the same, and channel resource slices allocated to WLAN devices that cannot perform packet concurrency in the first time period are different. In other words, channel resource slices are allocated to these WLAN devices in a same time period. However, in some cases, channel resource slices can be further allocated to WLAN devices that cannot perform packet concurrency in different time periods. For example, the plurality of WLAN devices further include a seventh WLAN device. The seventh WLAN device, the first WLAN device, and the second WLAN device each are associated with a different WLAN device. The packet concurrency status indicates that the first WLAN device and the seventh WLAN device can perform packet concurrency, and the second WLAN device and the seventh WLAN device cannot perform packet concurrency. In this case, the network device allocates channel resource slices to the first WLAN device and the seventh WLAN device from a channel resource in a second time period based on the packet concurrency status. The first time period is different from the second time period, and the channel resource slices allocated to the first WLAN device and the seventh WLAN device in the second time period are the same.

Because the packet concurrency status indicates that the first WLAN device and the seventh WLAN device can perform packet concurrency, and the second WLAN device and the seventh WLAN device cannot perform packet concurrency, the network device allocates a same channel resource slice to the first WLAN device and the second WLAN device from the channel resource in the first time period, and allocates a same channel resource slice to the first WLAN device and the seventh WLAN device from the channel resource in the second time period. In this way, for the second WLAN device and the seventh WLAN device that cannot perform packet concurrency, channel resource slices allocated by the network device to the two WLAN devices are located in different time periods, so that the two WLAN devices are isolated in terms of time resources, to ensure that the two WLAN devices do not interfere with each other when sending packets.

Optionally, the first time period and the second time period are located in two different periodicities. In other words, for the second WLAN device and the seventh WLAN device that cannot perform packet concurrency, the channel resource slices allocated by the network device to the two WLAN devices are located in different periodicities, so that the two WLAN devices are isolated in terms of time resources.

After allocating the channel resource slices to the plurality of WLAN devices, the network device needs to notify the plurality of WLAN devices of a channel resource allocation result, to indicate the plurality of WLAN devices to transmit packets based on the channel resource slices allocated by the network device. In addition, based on the foregoing description, the network device may be an AP, or may be a WLAN controller, or may be another computing device. Therefore, descriptions are separately provided below.

The network device is an AP. In this case, when the network device is a third WLAN device, the first WLAN device is associated with the third WLAN device, and the second WLAN device is associated with a fourth WLAN device, the third WLAN device sends a corresponding resource allocation result to the fourth WLAN device. The resource allocation result indicates a channel resource slice allocated to the second WLAN device. In this way, the third WLAN device can schedule the first WLAN device based on a channel resource slice allocated to the first WLAN device, and the fourth WLAN device can schedule the second WLAN device based on the channel resource slice allocated to the second WLAN device.

The network device is a WLAN controller or another computing device. In this case, when the first WLAN device is associated with a third WLAN device and the second WLAN device is associated with a fourth WLAN device, the network device notifies the third WLAN device of a channel resource slice allocated to the first WLAN device, and the network device notifies the fourth WLAN device of a channel resource slice allocated to the second WLAN device.

In an access periodicity of a channel, not only a data packet needs to be transmitted between an AP and a STA, but also some management frames may need to be transmitted. However, the data packet usually needs to be transmitted based on a channel resource slice allocated in a time period in which resource slicing can be performed, for example, the first time period and the second time period, and the management frame usually needs to be transmitted through free contention. In other words, the access periodicity of the channel includes a time period for resource slicing and a time period for free contention. Therefore, before allocating channel resource slices to the plurality of WLAN devices in the foregoing manner, the network device further needs to determine, within the access periodicity of the channel, a time length of a time period in which resource slicing can be performed. The following uses the first time period as an example for description.

The network device obtains a periodicity length and a time division proportion of an access periodicity of the channel. The time division proportion indicates a proportion of a time period in which resource slicing can be performed in the periodicity length. The network device determines a time length of the first time period based on the periodicity length of the access periodicity of the channel and the time division proportion.

The time division proportion may be a proportion of a time period for resource slicing in the access periodicity of the channel, or may be a proportion of a time period for non-resource slicing in the access periodicity of the channel. When the time division proportion is the proportion of the time period for resource slicing in the access periodicity of the channel, the network device multiplies the periodicity length of the access periodicity of the channel by the time division proportion, to obtain the time length of the first time period. When the time division proportion is the proportion of the time period for non-resource slicing in the access periodicity of the channel, the network device multiplies the periodicity length of the access periodicity of the channel by the time division proportion, to obtain the time length of the time period for non-resource slicing, and then subtracts the time length for non-resource slicing from the periodicity length, to obtain the time length of the first time period.

According to a second aspect, a resource allocation apparatus is provided. The resource allocation apparatus has a function of implementing behavior in the resource allocation method in the first aspect. The resource allocation apparatus includes at least one module, and the at least one module is configured to implement the resource allocation method provided in the first aspect.

According to a third aspect, a network device is provided. The network device includes a processor and a memory. The memory is configured to store a computer program for performing the resource allocation method provided in the first aspect. The processor is configured to execute the computer program stored in the memory, to implement the resource allocation method according to the first aspect.

Optionally, the network device may further include a communication bus, and the communication bus is configured to establish a connection between the processor and the memory.

According to a fourth aspect, a computer-readable storage medium is provided. The storage medium stores instructions, and when the instructions are run on a computer, the computer is enabled to perform the steps of the resource allocation method according to the first aspect.

According to a fifth aspect, a computer program product including instructions is provided. When the instructions are run on a computer, the computer is enabled to perform the steps of the resource allocation method according to the first aspect. In other words, a computer program is provided. When the computer program is run on a computer, the computer is enabled to perform the steps of the resource allocation method according to the first aspect.

Technical effects achieved in the second aspect, the third aspect, the fourth aspect, and the fifth aspect are similar to those achieved by corresponding technical means in the first aspect. Details are not described again herein.

The technical solutions provided in this application can bring at least the following beneficial effects:

The first WLAN device and the second WLAN device can perform packet concurrency, and it indicates that interference is minimum when the first WLAN device and the second WLAN device simultaneously transmit packets. Therefore, the network device allocates a same channel resource slice to the two WLAN devices from the channel resource in the first time period. In addition, because the first WLAN device and the second WLAN device are associated with different WLAN devices, after a same channel resource slice is allocated to the two WLAN devices, it can be ensured that no large interference is caused to each other during transmission, and packet transmission quality is not affected. In addition, it can be ensured that all WLAN devices associated with different WLAN devices can access a channel in a timely manner, to ensure a deterministic latency of each WLAN device.

DESCRIPTION OF EMBODIMENTS

Figures 1, 2:
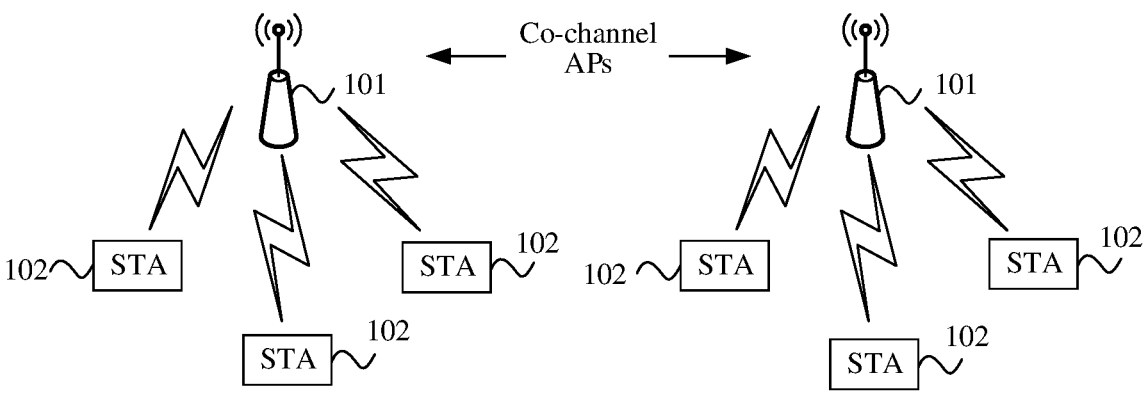
FIG. 1 is a schematic diagram of an implementation environment according to an embodiment of this application.
FIG. 2 is a schematic diagram of another implementation environment according to an embodiment of this application.

To make the objectives, technical solutions, and advantages of embodiments of this application clearer, the following further describes the implementations of this application in detail with reference to the accompanying drawings.

For ease of understanding, before a resource allocation method provided in embodiments of this application is described in detail, nouns, application scenarios, and implementation environments in embodiments of this application are first described.

Terms in embodiments of this application are first explained.

STA: The STA is a logical entity and is an independently addressable instance of a media access control and physical layer interface of a wireless medium. In a WLAN, the STA is a device having a wireless network adapter or a device having a WLAN module. The STA can move or remain stationary, and is a most basic component unit of the WLAN.

In some scenarios, the STA can be further coupled to some devices that do not have a wireless network adapter or a WLAN module. These devices are referred to as connected devices of the STA. The STA can transmit data of the connected devices via the WLAN. For example, in an industrial scenario, the STA can be coupled to some industrial devices such as a sensor and an industrial manufacturing device. The STA can transmit data of the industrial devices via the WLAN.

That the STA is coupled to the connected device means that the STA and the connected device are two independent devices, and the two independent devices can be connected, or it may be understood that the STA and the connected device are integrated together.

Association: The association is used to establish a mapping between a STA and an AP or a personal basic service set control point, and ensure that the STA can invoke a distribution system service. In other words, another most basic component unit of the WLAN is an AP, and the STA can establish a communication connection to the AP, to transmit data through the AP. A state in which the STA establishes a communication connection to the AP is referred to as an association. That is, after being associated with the AP, the STA can access the AP, or the AP can provide a service for the STA.

Signal strength: The signal strength indicates a strength of a signal sent by an AP sensed by a STA or a strength of a signal sent by a STA sensed by an AP, and in unit of dBm. Generally, the signal strength is a negative value. A larger value indicates better signal quality. In most scenarios, if a signal strength is −50 dBm or higher, it is considered that signal quality is good. If a signal strength is −70 dBm or lower, it is considered that signal quality is poor.

The following describes an application scenario and an implementation environment in embodiments of this application.

The method provided in embodiments of this application can be used in an industrial scenario, and can be further used in another scenario. The following provides descriptions by using an industrial scenario as an example. In the industrial scenario, an industrial controller is generally deployed to control and monitor a plurality of industrial devices. For example, the industrial controller is a programmable logic controller (Programmable Logic Controller, PLC). Because an area of an industrial factory is usually large, and industrial devices are distributed dispersedly, when the industrial controller is connected to the industrial devices in a wired manner, locations at which the industrial devices are deployed need to be determined, and the wired connection manner makes cabling in the industrial factory complex. To make the deployment of industrial devices more flexible, a plurality of APs are usually deployed in the industrial factory to implement WLAN coverage in the industrial factory. In this way, each industrial device is coupled to a STA, and the STA is associated with an AP, so that the plurality of industrial devices can access a WLAN, and finally can communicate with the industrial controller. In this case, the STA needs to send data of each coupled industrial device to the AP, and the AP forwards the data to the industrial controller. However, because a large quantity of APs are deployed, there may be APs corresponding to a same channel, that is, co-channel APs. In this case, according to the method provided in embodiments of this application, a channel resource slice can be allocated to each STA associated with the co-channel AP, to ensure that all STAs associated with different APs can access a channel in a timely manner, and also ensure packet transmission quality when a packet is sent. In this way, the industrial controller can finally control and monitor the plurality of industrial devices.

FIG. 1 is a schematic diagram of an implementation environment according to an example embodiment. The implementation environment includes a plurality of APs 101 (in FIG. 1, two APs are used as an example to represent the plurality of APs) and a plurality of STAs 102. The plurality of APs 101 correspond to a same channel, that is, the plurality of APs 101 are co-channel APs. Each AP 101 is associated with at least one STA 102 (in FIG. 1, three STAs associated with each AP are used to indicate the at least one STA as an example). In an industrial scenario, each STA can be further coupled to at least one connected device (not shown in FIG. 1).

In an actual application, the STA 102 can be used as an independent physical device for wired connection to at least one connected device. Certainly, the STA 102 may also be integrated into the connected device as a function module. That is, the STA 102 is integrated with the connected device. This is not limited in embodiments of this application.

Optionally, as shown in FIG. 2, the implementation environment further includes a WLAN controller 103, and the WLAN controller 103 is connected to the plurality of APs 101. The WLAN controller 103 is configured to manage the plurality of APs 101. For example, the WLAN controller 103 is configured to implement packet forwarding between a switch and the plurality of APs 101, and manage radio frequency calibration, air interface optimization, security authentication, and the like of the plurality of APs 101.

The resource allocation method provided in embodiments of this application is performed by a network device. In some embodiments, the network device is one AP 101 in the plurality of APs 101 shown in FIG. 1. In some other embodiments, the network device is the WLAN controller 103 shown in FIG. 2. Certainly, the network device may be another physical device other than the AP and the WLAN controller. For example, when the plurality of APs 101 are connected to another computing device, the network device is the computing device.

Regardless of which device the network device is, when allocating resources to STAs associated with a co-channel AP, the network device is configured to: obtain a packet concurrency status of the plurality of STAs, and allocate channel resource slices to the plurality of STAs from a channel resource based on the packet concurrency status of the plurality of STAs. The plurality of STAs include a first STA and a second STA, and the first STA and the second STA are associated with different APs. When the first STA and the second STA can perform packet concurrency, channel resource slices allocated to the first STA and the second STA are the same.

In the industrial scenario, the implementation environment further includes an industrial controller. The industrial controller is connected to the plurality of APs 101, and the plurality of APs 101 can forward data of devices connected to STAs associated with the plurality of APs 101 to the industrial controller, so that the industrial controller controls and monitors each industrial device.

Figure 3:
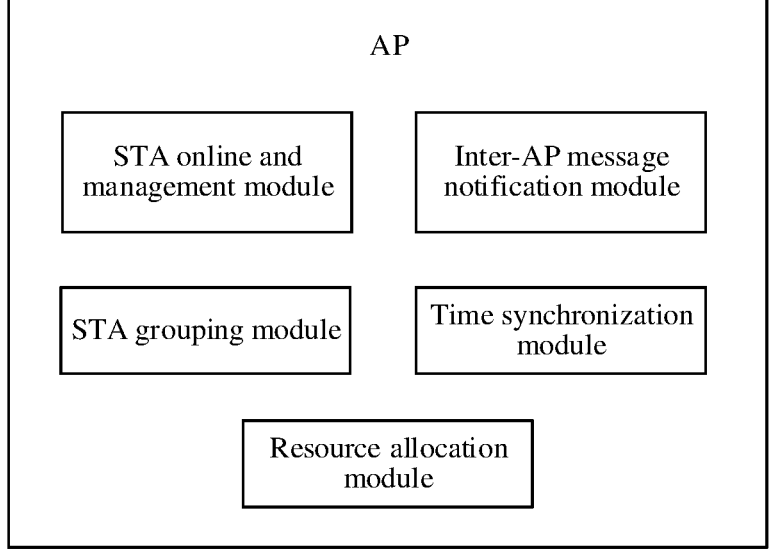
FIG. 3 is a schematic diagram of a structure of an AP according to an embodiment of this application.

The following describes structures of an AP and a STA. As shown in FIG. 3, the AP includes a STA online and management module, a STA grouping module, and a resource allocation module. Optionally, when the network device is an AP, the AP further includes an inter-AP message notification module. Optionally, the AP further includes a time synchronization module.

The STA online and management module is configured to: after receiving an association request frame sent by the STA, comprehensively determine, based on a capability of the STA, a capability of the AP, load information, and the like, whether to allow the STA to associate with the AP; and if the STA is allowed to associate with the AP, establish a data link channel to the STA. The STA grouping module is configured to: after the STA is associated with the AP, determine a packet concurrency status of STAs associated with a plurality of co-channel APs. The resource allocation module is configured to allocate a channel resource slice from a channel resource to each STA based on the packet concurrency status of the plurality of STAs. The inter-AP message notification module is configured to send a resource allocation result to another AP. The time synchronization module is configured to send a time synchronization frame to another AP, to complete time synchronization between the AP and the another AP.

Figure 4:
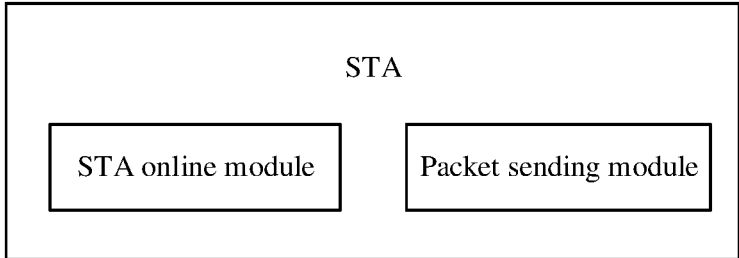
FIG. 4 is a schematic diagram of a structure of a STA according to an embodiment of this application.

As shown in FIG. 4, the STA includes a STA online module and a packet sending module. The STA online module is configured to send an association request frame to an AP with which the STA expects to associate, to request to associate with the AP. The message sending module is configured to send an uplink message to the AP after the STA is associated with the AP.

Figures 5, 6, 7:
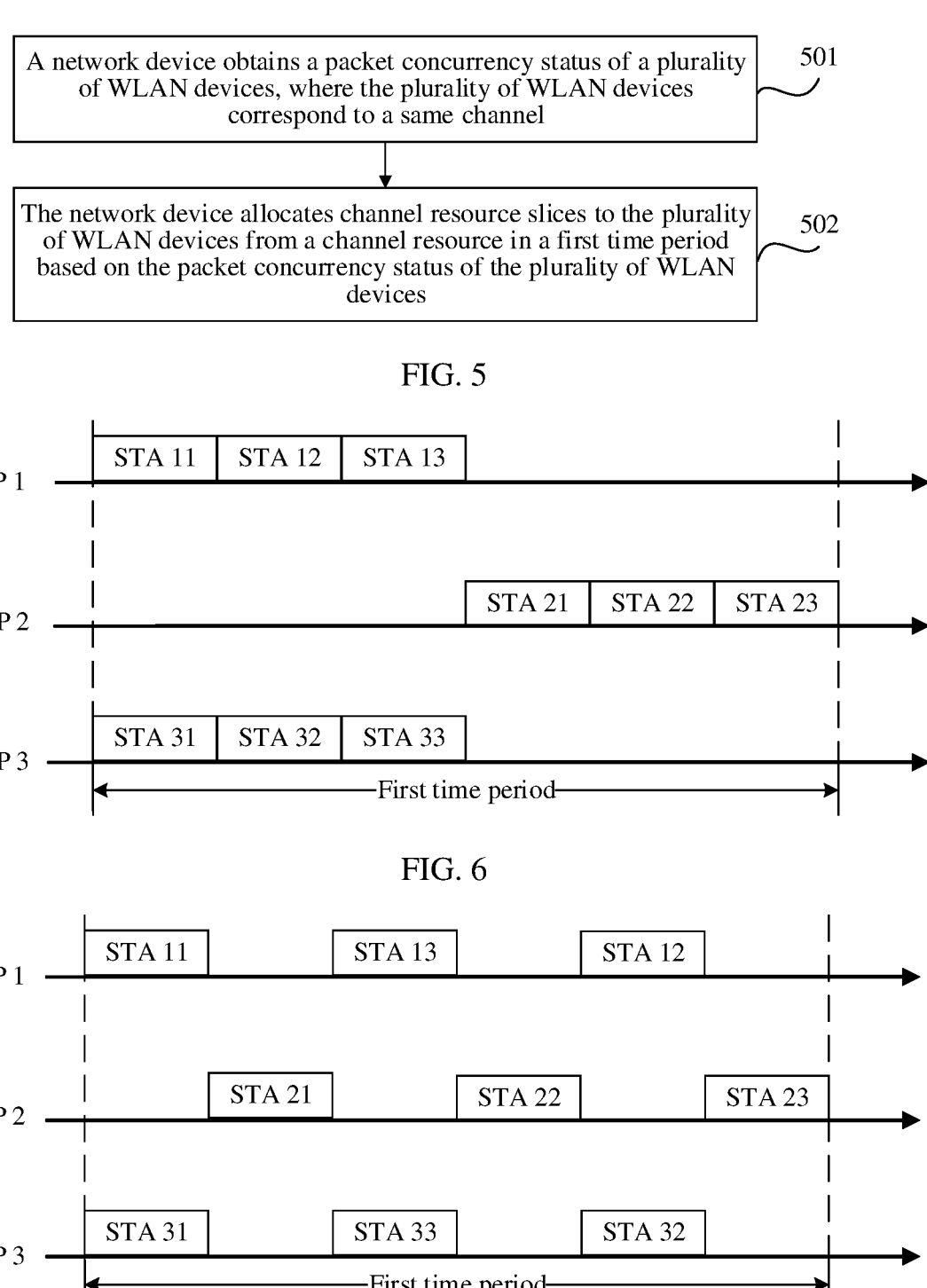
FIG. 5 is a flowchart of a resource allocation method according to an embodiment of this application.
FIG. 6 is a schematic diagram of a channel resource division manner according to an embodiment of this application.
FIG. 7 is a schematic diagram of another channel resource division manner according to an embodiment of this application.

After the terms, application scenarios, and implementation environments in embodiments of this application are described, the following describes in detail a resource allocation method provided in embodiments of this application. FIG. 5 is a flowchart of a resource allocation method according to an embodiment of this application. In this embodiment of this application, for ease of description, an AP and a STA are collectively referred to as WLAN devices. As shown in FIG. 5, the method includes the following steps.

Step 501: A network device obtains a packet concurrency status of a plurality of WLAN devices, where the plurality of WLAN devices correspond to a same channel.

The plurality of WLAN devices are a plurality of STAs, the plurality of STAs are associated with at least two APs, and the at least two APs correspond to a same channel. That is, the at least two APs are co-channel APs, and the plurality of STAs are STAs associated with the co-channel APs. The packet concurrency status of the plurality of WLAN devices refers to whether the plurality of WLAN devices can simultaneously send and/or receive packets.

When a plurality of WLAN devices corresponding to a same channel all need to send and/or receive packets, the channel may be occupied by some WLAN devices, and other WLAN devices cannot access the channel. In this case, the other WLAN devices cannot send and/or receive packets. If the plurality of WLAN devices can simultaneously send and/or receive packets, and packet transmission quality is not affected, that is, if all packets sent and/or received by the plurality of WLAN devices can be correctly parsed, channel occupation time can be reduced to some extent, so that the plurality of WLAN devices all access the channel. Therefore, the network device needs to obtain the packet concurrency status of the plurality of WLAN devices.

There are a plurality of implementations in which the network device obtains the packet concurrency status of the plurality of WLAN devices. The following describes three of the implementations. For ease of understanding, the plurality of WLAN devices are directly referred to as STAs, and WLAN devices associated with the plurality of WLAN devices are directly referred to as APs in the following, to describe determining the packet concurrency status of the plurality of STAs.

In a first implementation, the network device obtains decision-making region information. The decision-making region information indicates a status of mutual sensing between every two WLAN devices in the plurality of WLAN devices and WLAN devices associated with the plurality of WLAN devices. The network device determines the packet concurrency status of the plurality of WLAN devices based on the decision-making region information.

The at least two APs associated with the plurality of STAs each determine a plurality of sensing statuses. The plurality of sensing statuses include sensing statuses of the AP for other devices, and sensing statuses of the STAs associated with the AP for other devices. The at least two APs each send the plurality of determined sensing statuses to the network device. In this way, the network device can receive the plurality of sensing statuses, and determine the decision domain information based on the plurality of sensing statuses. Then, the network device can determine the packet concurrency status of the plurality of STAs based on the determined decision-making region information.

In some embodiments, if none of a first AP and a second AP, the first AP and a second STA, a first STA and the second AP, and the first STA and the second STA can sense each other, it is determined that the first STA and the second STA can perform packet concurrency. If not all of the first AP and the second AP, the first AP and the second STA, the first STA and the second AP, and the first STA and the second STA can sense each other, it is determined that the first STA and the second STA cannot perform packet concurrency. The first STA is associated with the first AP, the second STA is associated with the second AP, and the first STA and the second STA are any two STAs in the plurality of STAs. The packet concurrency status also needs to be determined for another STA in the plurality of STAs in this manner. In this way, the packet concurrency status of the plurality of STAs can be obtained.

The first AP and the second AP are used as an example. If the first AP cannot sense the second AP and the second AP cannot sense the first AP, it is considered that the first AP and the second AP cannot sense each other. If the first AP can sense the second AP but the second AP cannot sense the first AP, or the first AP cannot sense the second AP but the second AP can sense the first AP, it is considered that the first AP and the second AP can sense each other. Similarly, whether any other two devices can sense each other may also be determined in this manner.

If none of the first AP and the second AP, the first AP and the second STA, the first STA and the second AP, and the first STA and the second STA can sense each other, it indicates that the first AP and the first STA are far away from the second AP and the second STA, and a strength of a received signal sent by the other party is weak. In this case, if the first STA and the second STA perform packet concurrency, the first STA and the second STA do not affect each other. Therefore, it is determined that the first STA and the second STA can perform packet concurrency. If not all of the first AP and the second AP, the first AP and the second STA, the first STA and the second AP, and the first STA and the second STA can sense each other, it indicates that the first AP is close to the second AP or the second STA, or the first STA is close to the second AP or the second STA. In this case, if the first STA and the second STA perform packet concurrency, the first STA and the second STA may affect each other. Therefore, it is determined that the first STA and the second STA cannot perform packet concurrency.

It should be noted that, when any two devices in the plurality of STAs and the at least two APs associated with the plurality of STAs cannot sense each other, the network device directly determines that the plurality of STAs can perform packet concurrency.

In the first implementation, for any two WLAN devices, for example, a first WLAN device and a second WLAN device, if a strength of a signal sent by the second WLAN device and received by the first WLAN device is less than a signal strength threshold, it is determined that the first WLAN device cannot sense the second WLAN device. If the strength of the signal sent by the second WLAN device and received by the first WLAN device is greater than or equal to the signal strength threshold, it is determined that the first WLAN device can sense the second WLAN device. The signal strength threshold is preset. For example, the signal strength threshold may be set to −90 decibel-milliwatts (dBmW). In addition, in different cases, the signal strength threshold may be further adjusted according to different requirements.

In other words, any two WLAN devices can receive signals sent by each other. In the foregoing first implementation, whether the plurality of WLAN devices can sense each other is determined based on the signal strength threshold, to further determine the packet concurrency status of the plurality of WLAN devices based on mutual sensing statuses of the plurality of WLAN devices. Certainly, whether the plurality of WLAN devices can sense each other may not be determined based on the signal strength threshold, but the packet concurrency status of the plurality of WLAN devices is directly determined based on strengths of signals received by the WLAN devices, that is, the following second implementation.

In the second implementation, the network device obtains a packet measurement result. The packet measurement result includes strengths of signals that can be received between every two WLAN devices in the plurality of WLAN devices and the WLAN devices associated with the plurality of WLAN devices. The network device determines the packet concurrency status of the plurality of WLAN devices based on the obtained packet measurement result.

The at least two APs associated with the plurality of STAs each determine a plurality of signal strengths. The plurality of signal strengths include a strength of a signal sent by another device and received by the AP, and a strength of a signal sent by another device and received by each STA associated with the AP. The at least two APs each send the plurality of determined signal strengths to the network device. In this way, the network device can obtain the packet measurement result. Then, the network device can determine the packet concurrency status of the plurality of STAs based on the obtained packet measurement result.

Any STA in the plurality of STAs sends an uplink measurement packet, another STA in the plurality of STAs detects a signal strength of the uplink measurement packet, and the at least two APs associated with the plurality of STAs also detect a signal strength of the uplink measurement packet. Similarly, any AP in the at least two APs sends a downlink measurement packet, the plurality of STAs detect a signal strength of the downlink measurement packet, and another AP in the at least two APs also detects a signal strength of the downlink measurement packet. In this way, after each STA sends an uplink measurement packet and each AP sends a downlink measurement packet, each STA can obtain a strength of a signal sent by another device and received by the STA, and each AP can also obtain a strength of a signal sent by another device and received by the AP. Then, each STA sends, to an AP associated with the STA, a strength of a signal sent by another device and received by the STA. In this way, each of the at least two APs can obtain a plurality of signal strengths, the plurality of signal strengths include a strength of a signal sent by another device and received by the AP, and a strength of a signal sent by another device and received by each STA associated with the AP.

A STA can receive a packet sent by an AP, and can also send a packet to an AP. The packet sent by the AP to the STA is referred to as a downlink packet, and the packet sent by the STA to the AP is referred to as an uplink packet. In addition, based on the foregoing description, the packet concurrency status of the plurality of STAs indicates whether the plurality of STAs can simultaneously send and/or receive packets. Therefore, the packet concurrency status of the plurality of STAs may be classified into an uplink packet concurrency status, a downlink packet concurrency status, and an uplink and downlink packet concurrency status. The following separately describes processes of determining the three types of packet concurrency statuses.

First type: The packet concurrency status of the plurality of STAs is an uplink and downlink packet concurrency status. In this case, the network device determines differences between a first signal strength and each of a second signal strength and a third signal strength. The first signal strength is a strength of a signal sent by the first AP and received by the first STA, the second signal strength is a strength of a signal sent by the second AP and received by the first STA, and the third signal strength is a strength of a signal sent by the second STA and received by the first STA. The network device determines differences between a fourth signal strength and each of a fifth signal strength and a sixth signal strength. The fourth signal strength is a strength of a signal sent by the first STA and received by the first AP, the fifth signal strength is a strength of a signal sent by the second AP and received by the first AP, and the sixth signal strength is a strength of a signal sent by the second STA and received by the first AP. The network device determines differences between a seventh signal strength and each of an eighth signal strength and a ninth signal strength. The seventh signal strength is a strength of a signal sent by the second AP and received by the second STA, the eighth signal strength is a strength of a signal sent by the first AP and received by the second STA, and the ninth signal strength is a strength of a signal sent by the first STA and received by the second STA. The network device determines differences between a tenth signal strength and each of an eleventh signal strength and a twelfth signal strength. The tenth signal strength is a strength of a signal sent by the second STA and received by the second AP, the eleventh signal strength is a strength of a signal sent by the first AP and received by the second AP, and the twelfth signal strength is a strength of a signal sent by the first STA and received by the second AP. The eight differences are obtained through the foregoing process. If all the eight differences are greater than or equal to a reference signal interference, it is determined that the first STA and the second STA can perform uplink and downlink packet concurrency. If not all the eight differences are greater than or equal to the reference signal interference, it is determined that the first STA and the second STA cannot perform uplink and downlink packet concurrency. The first STA is associated with the first AP, the second STA is associated with the second AP, and the first STA and the second STA are any two STAs in the plurality of STAs. The packet concurrency status also needs to be determined for another STA in the plurality of STAs in this manner. In this way, the uplink and downlink packet concurrency status of the plurality of STAs can be obtained.

When the first STA receives a packet sent by the first AP, if a signal strength of a packet sent by the second STA or the second AP is high, that is, signal quality of the packet that can be received by the first STA from the second STA or the second AP is good, the packet sent by the second STA or the second AP causes interference to the packet sent by the first AP. Consequently, the packet sent by the first AP cannot be correctly parsed. Therefore, to ensure that the first STA can correctly parse the received packet, it needs to be ensured that a signal-to-interference ratio is within an acceptable range. To be specific, a difference between a signal strength of the packet sent by the first AP and received by the first STA and a signal strength of the packet sent by the second STA or the second AP should be greater than or equal to a reference signal-to-interference ratio. Similarly, when the first AP receives a packet sent by the first STA, a difference between a signal strength of the packet sent by the first STA and received by the first AP and a signal strength of a packet sent by the second STA or the second AP should also be greater than or equal to the reference signal-to-interference ratio. When the second STA receives a packet sent by the second AP, a difference between a signal strength of the packet sent by the second AP and received by the second STA and a signal strength of a packet sent by the first STA or the first AP should be greater than or equal to the reference signal-to-interference ratio. When the second AP receives a packet sent by the second STA, a difference between a signal strength of the packet sent by the second STA and received by the second AP and a signal strength of a packet sent by the first STA or the first AP should be greater than or equal to the reference signal-to-interference ratio. Therefore, when the network device determines that all the eight differences are greater than or equal to the reference signal to interference ratio, it is determined that the first STA and the second STA can perform uplink and downlink packet concurrency. That is, the first STA and the second STA can simultaneously send packets to the APs associated with the first STA and the second STA, and can simultaneously receive packets sent by the APs associated with the first STA and the second STA. When the network device determines that not all the eight differences are greater than or equal to the reference signal to interference ratio, it is determined that the first STA and the second STA cannot perform uplink and downlink packet concurrency. That is, the first STA and the second STA cannot simultaneously send packets to the APs associated with the first STA and the second STA, and/or cannot simultaneously receive packets sent by the APs associated with the first STA and the second STA.

The reference signal-to-interference ratio is a signal-to-interference ratio required for correctly parsing a packet. The reference signal-to-interference ratio is preset. For example, the reference signal-to-interference ratio is 22. In addition, in different cases, the reference signal-to-interference ratio may be further adjusted according to different requirements.

For a STA and an AP, power for sending an uplink measurement packet by the STA may be the same as or different from power for sending a downlink measurement packet by the AP. When the power for sending the uplink measurement packet by the STA is the same as the power for sending the downlink measurement packet by the AP, a signal strength of the downlink measurement packet sent by the AP and received by the STA is the same as a signal strength of the uplink measurement packet sent by the STA and received by the AP. When the power for sending the uplink measurement packet by the STA is different from the power for sending the downlink measurement packet by the AP, a signal strength of the downlink measurement packet sent by the AP and received by the STA is different from a signal strength of the uplink measurement packet sent by the STA and received by the AP.

If power for sending an uplink measurement packet by the first STA is the same as power for sending a downlink measurement packet by the first AP, the strength of the signal sent by the first AP and received by the first STA is the same as the strength of the signal sent by the first STA and received by the first AP. In this case, the first signal strength is the same as the fourth signal strength. Similarly, if power for sending an uplink measurement packet by the first STA is the same as power for sending a downlink measurement packet by the second AP, the second signal strength is the same as the twelfth signal strength. If power for sending an uplink measurement packet by the first STA is the same as power for sending an uplink measurement packet by the second STA, the third signal strength is the same as the ninth signal strength. If power for sending a downlink measurement packet by the first AP is the same as power for sending an uplink measurement packet by the second AP, the fifth signal strength is the same as the eleventh signal strength. If power for sending a downlink measurement packet by the first AP is the same as power for sending an uplink measurement packet by the second STA, the sixth signal strength is the same as the eighth signal strength. If power for sending a downlink measurement packet by the second AP is the same as power for sending an uplink measurement packet by the second STA, the seventh signal strength is the same as the tenth signal strength.

For example, signal strengths in the packet measurement result obtained by the network device are shown in Table 1. Power for sending an uplink measurement packet by each STA is the same as power for sending a downlink measurement packet by each AP, a STA 11 is associated with an AP 1, and a STA 21 and a STA 22 are associated with an AP 2.

For the STA 11 and the STA 21, strengths of signals received by the AP 1 and the STA 11 from each other are −50, strengths of signals received by the STA 11 and the AP 2 from each other are −72, strengths of signals received by the STA 11 and the STA 21 from each other are −75, strengths of signals received by the AP 1 and the AP 2 from each other are −75, strengths of signals received by the AP 1 and the STA 21 from each other are −73, and strengths of signals received by the AP 2 and the STA 21 from each other are −50. Therefore, the first signal strength is −50, the second signal strength is −72, the third signal strength is −75, the fifth signal strength is −75, the sixth signal strength is −73, and the seventh signal strength is −50. In this case, a difference between the first signal strength and the second signal strength is 22, a difference between the first signal strength and the third signal strength is 25, a difference between the first signal strength and the fifth signal strength is 25, a difference between the first signal strength and the sixth signal strength is 23, a difference between the seventh signal strength and the second signal strength is 22, a difference between the seventh signal strength and the third signal strength is 25, a difference between the seventh signal strength and the fifth signal strength is 25, and a difference between the seventh signal strength and the sixth signal strength is 23. When the reference signal-to-interference ratio is 22, the foregoing eight differences are all greater than or equal to the reference signal-to-interference ratio. Therefore, it is determined that the STA 11 and the STA 21 can perform uplink and downlink packet concurrency.

For the STA 11 and the STA 22, strengths of signals received by the AP 1 and the STA 11 from each other are −50, strengths of signals received by the STA 11 and the AP 2 from each other are −72, strengths of signals received by the STA 11 and the STA 22 from each other are −60, strengths of signals received by the AP 1 and the AP 2 from each other are −75, strengths of signals received by the AP 1 and the STA 22 from each other are −73, and strengths of signals received by the AP 2 and the STA 22 from each other are −52. Therefore, the first signal strength is −50, the second signal strength is −72, the third signal strength is −60, the fifth signal strength is −75, the sixth signal strength is −72, and the seventh signal strength is −52. In this case, a difference between the first signal strength and the second signal strength is 22, a difference between the first signal strength and the third signal strength is 10, a difference between the first signal strength and the fifth signal strength is 25, a difference between the first signal strength and the sixth signal strength is 22, a difference between the seventh signal strength and the second signal strength is 20, a difference between the seventh signal strength and the third signal strength is 8, a difference between the seventh signal strength and the fifth signal strength is 23, and a difference between the seventh signal strength and the sixth signal strength is 20. When the reference signal-to-interference ratio is 22, not all the foregoing eight differences are greater than or equal to the reference signal-to-interference ratio. Therefore, it is determined that the STA 11 and the STA 22 cannot perform uplink and downlink packet concurrency.

TABLE 1

|  | AP 1 | AP 2 | STA 11 | STA 21 | STA 22 |
|---|---|---|---|---|---|
| AP 1 | 0 | −75 | −50 | −73 | −72 |
| AP 2 | −75 | 0 | −72 | −50 | −52 |
| STA 11 | −50 | −72 | 0 | −75 | −60 |
| STA 21 | −73 | −50 | −75 | 0 | −25 |
| STA 22 | −72 | −52 | −60 | −25 | 0 |

Second type: The packet concurrency status of the plurality of STAs is an uplink packet concurrency status. In this case, the network device determines differences between the fourth signal strength and each of the fifth signal strength and the sixth signal strength, and determines differences between the tenth signal strength and each of the eleventh signal strength and the twelfth signal strength, to obtain the four differences. If all the four differences are greater than or equal to the reference signal interference, it is determined that the first STA and the second STA can perform uplink packet concurrency. If not all the four differences are greater than or equal to the reference signal interference, it is determined that the first STA and the second STA cannot perform uplink packet concurrency. The uplink packet concurrency status also needs to be determined for another STA in the plurality of STAs in this manner. In this way, the uplink packet concurrency status of the plurality of STAs can be obtained.

Same as above, when the first AP receives a packet sent by the first STA, a difference between a signal strength of the packet sent by the first STA and received by the first AP and a signal strength of a packet sent by the second STA or the second AP should be greater than or equal to the reference signal-to-interference ratio. When the second AP receives a packet sent by the second STA, a difference between a signal strength of the packet sent by the second STA and received by the second AP and a signal strength of a packet sent by the first STA or the first AP should be greater than or equal to the reference signal-to-interference ratio. Therefore, when the network device determines that all the four differences are greater than or equal to the reference signal to interference ratio, it is determined that the first STA and the second STA can perform uplink packet concurrency. That is, the first STA and the second STA can simultaneously send packets to the APs associated with the first STA and the second STA. When the network device determines that not all the four differences are greater than or equal to the reference signal to interference ratio, it is determined that the first STA and the second STA cannot perform uplink packet concurrency. That is, the first STA and the second STA cannot simultaneously send packets to the APs associated with the first STA and the second STA.

Third type: The packet concurrency status of the plurality of STAs is a downlink packet concurrency status. In this case, the network device determines differences between the first signal strength and each of the second signal strength and the third signal strength, and determines differences between the seventh signal strength and each of the eighth signal strength and the ninth signal strength, to obtain the four differences. If all the four differences are greater than or equal to the reference signal interference, it is determined that the first STA and the second STA can perform downlink packet concurrency. If not all the four differences are greater than or equal to the reference signal interference, it is determined that the first STA and the second STA cannot perform downlink packet concurrency. The downlink packet concurrency status also needs to be determined for another STA in the plurality of STAs in this manner. In this way, downlink packet concurrency status of the plurality of STAs can be obtained.

Same as above, when the first STA receives a packet sent by the first AP, a difference between a signal strength of the packet sent by the first AP and received by the first STA and a signal strength of a packet sent by the second STA or the second AP should be greater than or equal to the reference signal-to-interference ratio. When the second STA receives a packet sent by the second AP, a difference between a signal strength of the packet sent by the second AP and received by the second STA and a signal strength of a packet sent by the first STA or the first AP should be greater than or equal to the reference signal-to-interference ratio. Therefore, when the network device determines that all the four differences are greater than or equal to the reference signal to interference ratio, it is determined that the first STA and the second STA can perform downlink packet concurrency. That is, the first STA and the second STA can simultaneously receive packets sent by the APs associated with the first STA and the second STA. When the network device determines that not all the four differences are greater than or equal to the reference signal to interference ratio, it is determined that the first STA and the second STA cannot perform downlink packet concurrency. That is, the first STA and the second STA cannot simultaneously receive packets sent by the APs associated with the first STA and the second STA.

In a third implementation, the network device obtains decision-making region information and a packet measurement result, and determines the packet concurrency status of the plurality of WLAN devices based on the decision-making region information and the packet measurement result.

For a specific process of determining the decision-making region information and the packet measurement result, refer to the foregoing corresponding content. Details are not described herein again.

In some embodiments, if none of the first AP and the second AP, the first AP and the second STA, the first STA and the second AP, and the first STA and the second STA can sense each other, it is determined that the first STA and the second STA can perform packet concurrency. If not all of the first AP and the second AP, the first AP and the second STA, the first STA and the second AP, and the first STA and the second STA can sense each other, the network device determines a packet concurrency status of the first STA and the second STA based on the packet measurement result. For a detailed process in which the network device determines the packet concurrency status of the first STA and the second STA based on the packet measurement result, refer to the foregoing corresponding content. Details are not described herein again.

The first STA is associated with the first AP, the second STA is associated with the second AP, and the first STA and the second STA are any two STAs in the plurality of STAs. The packet concurrency status also needs to be determined for another STA in the plurality of STAs in this manner. In this way, the packet concurrency status of the plurality of STAs can be obtained.

That is, whether the first STA and the second STA can perform packet concurrency is first preliminarily determined based on the decision-making region information. If none of the first AP and the second AP, the first AP and the second STA, the first STA and the second AP, and the first STA and the second STA can sense each other, it indicates that the first AP and the first STA are far away from the second AP and the second STA, and a strength of a received signal sent by the other party is weak. Therefore, it is directly determined that the first STA and the second STA can perform packet concurrency. If not all of the first AP and the second AP, the first AP and the second STA, the first STA and the second AP, and the first STA and the second STA can sense each other, it indicates that the first AP is close to the second AP or the second STA, or the first STA is close to the second AP or the second STA. In this case, if the first STA and the second STA perform packet concurrency, the first STA and the second STA may affect each other, or may not affect each other. Therefore, further analysis is required. That is, whether the first STA and the second STA can perform packet concurrency is determined again based on the packet measurement result.

In the foregoing method, some STAs that can perform packet concurrency are first determined based on the decision-making region information. For some STAs, whether the STAs can perform packet concurrency cannot be determined based on the decision-making region information, and needs to be determined again based on the packet measurement result, to determine whether the STAs can finally perform packet concurrency. Therefore, the method can further reduce a calculation amount of determining, by the network device, the packet concurrency status based on the packet measurement result, and can also avoid a problem that an error occurs when the packet concurrency status is determined based on only the decision-making region information. For example, STAs that can actually perform packet concurrency are determined as incapable of performing packet concurrency. In this way, accuracy of determining the packet concurrency status can be further improved.

It should be noted that the network device can not only determine the packet concurrency status of the plurality of WLAN devices in the foregoing three implementations, but also determine the packet concurrency status of the plurality of WLAN devices in another implementation. This is not limited in this embodiment of this application.

Step 502: The network device allocates channel resource slices to the plurality of WLAN devices from a channel resource in a first time period based on the packet concurrency status of the plurality of WLAN devices. The plurality of WLAN devices include the first WLAN device and the second WLAN device, the first WLAN device and the second WLAN device are associated with different WLAN devices, the packet concurrency status indicates that the first WLAN device and the second WLAN device can perform packet concurrency, and channel resource slices allocated to the first WLAN device and the second WLAN device are the same.

A channel resource slice is a partial channel resource allocated by the network device to a WLAN device from a channel resource, and the channel resource includes a frequency resource and/or a time resource. When the channel resource includes the frequency resource, the channel resource slice is a partial frequency resource allocated by the network device to the WLAN device from the frequency resource of the channel. When the channel resource includes the time resource, the channel resource slice is a partial time resource allocated by the network device to the WLAN device from the time resource of the channel.

The packet concurrency status indicates that the first WLAN device and the second WLAN device can perform packet concurrency, and it indicates that interference is minimum when the first WLAN device and the second WLAN device simultaneously send packets. Therefore, the network device allocates a same channel resource slice to the two WLAN devices from the channel resource in the first time period. In this way, when the two WLAN devices simultaneously send packets, no large interference is caused to each other, and packet transmission quality is not affected.

In some embodiments, the plurality of WLAN devices further include a fifth WLAN device and a sixth WLAN device. The fifth WLAN device and the sixth WLAN device are associated with different WLAN devices. The packet concurrency status indicates that the fifth WLAN device and the sixth WLAN device cannot perform packet concurrency, and channel resource slices allocated to the fifth WLAN device and the sixth WLAN device are different.

The packet concurrency status indicates that the fifth WLAN device and the sixth WLAN device cannot perform packet concurrency, and it indicates that interference may be large when the fifth WLAN device and the sixth WLAN device simultaneously send packets. Therefore, the network device allocates different channel resource slices to the two WLAN devices from the channel resource in the first time period. In this way, when the two WLAN devices simultaneously send packets by using different channel resource slices, no large interference is caused to each other, and packet transmission quality is not affected.

In some embodiments, the channel resource includes the frequency resource and/or the time resource. Therefore, the channel resource slices allocated by the network device to the plurality of WLAN devices from the channel resource in the first time period based on the packet concurrency status are frequency resource slices and/or time resource slices. In addition, because there may be a plurality of types of packet concurrency statuses of the plurality of WLAN devices, the network device may allocate the channel resource slices to the plurality of WLAN devices from the channel resource in the first time period in different manners. Even for a same packet concurrency status, the network device may also allocate the channel resource slices to the plurality of WLAN devices from the channel resource in the first time period in different manners. That is, there are a plurality of manners of allocating channel resource slices to the plurality of WLAN devices from the channel resource in the first time period based on the packet concurrency status. However, a fundamental objective is to allocate different channel resource slices to WLAN devices that cannot perform packet concurrency, so that the WLAN devices that cannot perform packet concurrency are isolated in time and/or frequency, to ensure packet transmission quality.

The following describes several channel resource division manners. However, the following several manners do not limit the channel resource division manner in embodiments of this application.

In a first manner, a channel resource includes a time resource, time resource slices allocated to STAs that can perform packet concurrency are the same, time resource slices allocated to STAs that cannot perform packet concurrency are different, and time resource slices allocated to STAs that are associated with a same AP and that cannot perform packet concurrency are continuous.

For example, as shown in Table 2, a packet concurrency status of the plurality of STAs is shown in Table 2. A STA 11, a STA 12, and a STA 13 are associated with an AP 1, a STA 21, a STA 22, and a STA 23 are associated with an AP 2, and a STA 31, a STA 32, and a STA 33 are associated with an AP 3.

TABLE 2

| Packet concurrency status | STA |
| --- | --- |
| Can perform packet concurrency | STA 11 and STA 31 |
| Can perform packet concurrency | STA 12 and STA 32 |
| Can perform packet concurrency | STA 13 and STA 33 |
| Cannot perform packet concurrency with another STA | STA 21 |
| Cannot perform packet concurrency with another STA | STA 22 |
| Cannot perform packet concurrency with another STA | STA 23 |

The STA 11 can perform packet concurrency with the STA 31, the STA 12 can perform packet concurrency with the STA 32, and the STA 13 can perform packet concurrency with the STA 33. Therefore, as shown in FIG. 6, the network device separately allocates, from the channel resource in the first time period, a same time resource slice to a same group of STAs that can perform packet concurrency. The STA 21, the STA 22, and the STA 23 cannot perform packet concurrency with another STA, the network device allocates, from the channel resource in the first time period, time resource slices different from those of other STAs to the STA 21, the STA 22, and the STA 23. Time resource slices allocated to STAs that are associated with a same AP and that cannot perform packet concurrency are continuous.

In a second manner, a channel resource includes a time resource, time resource slices allocated to STAs that can perform packet concurrency are the same, time resource slices allocated to STAs that cannot perform packet concurrency are different, and time resource slices allocated to STAs that are associated with a same AP and that cannot perform packet concurrency are discontinuous.

For example, a packet concurrency status of the plurality of STAs is still shown in Table 2. The STA 11 can perform packet concurrency with the STA 31, the STA 12 can perform packet concurrency with the STA 32, and the STA 13 can perform packet concurrency with the STA 33. Therefore, as shown in FIG. 7, the network device separately allocates, from the channel resource in the first time period, a same time resource slice to a same group of STAs that can perform packet concurrency. The STA 21, the STA 22, and the STA 23 cannot perform packet concurrency with another STA, the network device allocates, from the channel resource in the first time period, time resource slices different from those of other STAs to the STA 21, the STA 22, and the STA 23. Time resource slices allocated to STAs that are associated with a same AP and that cannot perform packet concurrency are discontinuous.

In a third manner, a channel resource includes a time resource and a frequency resource, time resource slices and frequency resource slices allocated to STAs that can perform packet concurrency are the same, frequency resource slices allocated to STAs that are associated with a same AP and that cannot perform packet concurrency are different, and time resource slices allocated to STAs associated with a same AP are the same.

Figure 8:
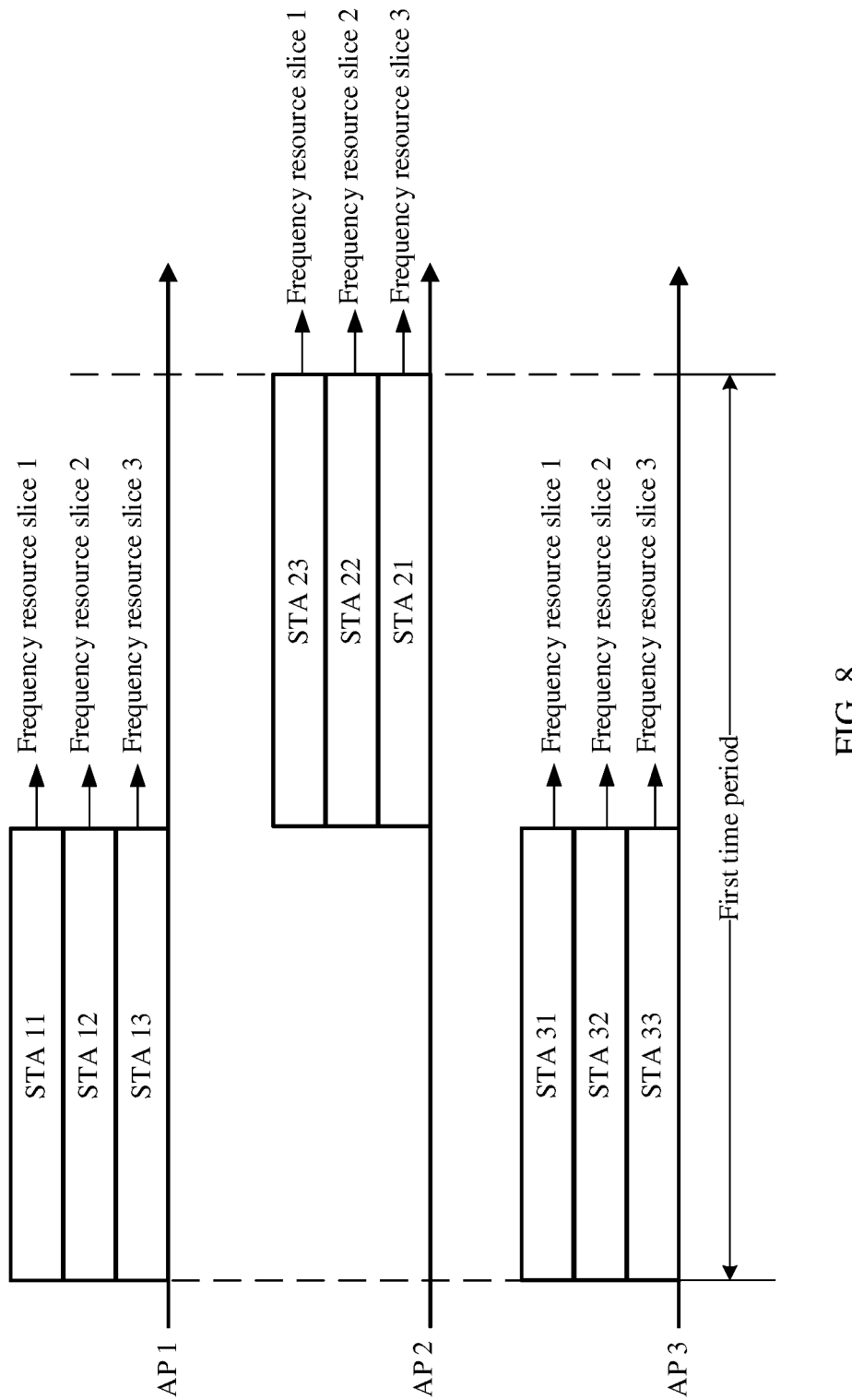
FIG. 8 is a schematic diagram of another channel resource division manner according to an embodiment of this application.

For example, a packet concurrency status of the plurality of STAs is still shown in Table 2. The STA 11 can perform packet concurrency with the STA 31, the STA 12 can perform packet concurrency with the STA 32, and the STA 13 can perform packet concurrency with the STA 33. Therefore, as shown in FIG. 8, the network device separately allocates, from the channel resource in the first time period, a same time resource slice and a same frequency resource slice to a same group of STAs that can perform packet concurrency. Time resource slices allocated to STAs associated with a same AP are the same. Because the STA 21, the STA 22, and the STA 23 cannot perform packet concurrency with another STA, and the STA 21, the STA 22, and the STA 23 are associated with a same AP, the network device allocates different frequency resource slices and a same time resource slice to the STA 21, the STA 22, and the STA 23 from the channel resource in the first time period.

In a fourth manner, a channel resource includes a time resource and a frequency resource, time resource slices and frequency resource slices allocated to STAs that can perform packet concurrency are the same, time resource slices allocated to STAs that are associated with a same AP and that cannot perform packet concurrency are different, and frequency resource slices allocated to STAs associated with a same AP are the same.

Figure 9:
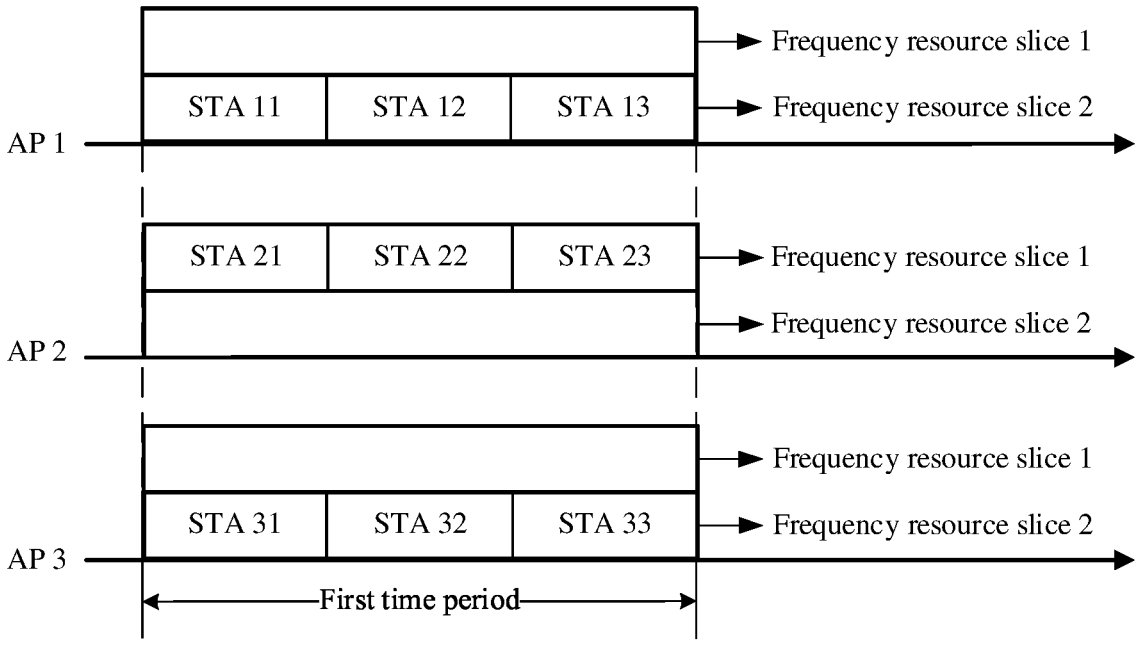
FIG. 9 is a schematic diagram of another channel resource division manner according to an embodiment of this application.

For example, a packet concurrency status of the plurality of STAs is still shown in Table 2. The STA 11 can perform packet concurrency with the STA 31, the STA 12 can perform packet concurrency with the STA 32, and the STA 13 can perform packet concurrency with the STA 33. Therefore, as shown in FIG. 9, the network device separately allocates, from the channel resource in the first time period, a same time resource slice and a same frequency resource slice to a same group of STAs that can perform packet concurrency. Time resource slices allocated to STAs associated with a same AP are different. Because the STA 21, the STA 22, and the STA 23 cannot perform packet concurrency with another STA, and the STA 21, the STA 22, and the STA 23 are associated with a same AP, the network device allocates frequency resource slices different those of other STAs to the STA 21, the STA 22, and the STA 23 from the channel resource in the first time period. Time resource slices allocated to the STA 21, the STA 22, and the STA 23 are different.

In a fifth manner, a channel resource includes a time resource, and when STAs that can perform packet concurrency are associated with different APs, time resource slices allocated to the STAs that can perform packet concurrency are the same.

For example, as shown in Table 3, a packet concurrency status of the plurality of STAs is shown in Table 3. The STA 11, the STA 12, and the STA 13 are associated with the AP 1, the STA 21, the STA 22, and the STA 23 are associated with the AP 2, and the STA 31, the STA 32, and the STA 33 are associated with the AP 3.

TABLE 3

| Packet concurrency status | STA |
| --- | --- |
| Can perform packet concurrency | STA 11, STA 21, and STA 31 |
| Can perform packet concurrency | STA 12, STA 22, and STA 32 |
| Can perform packet concurrency | STA 13, STA 23, and STA 33 |

Figure 10:
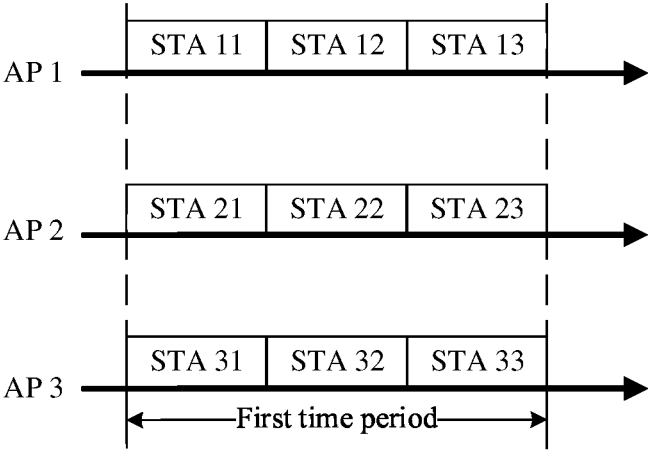
FIG. 10 is a schematic diagram of another channel resource division manner according to an embodiment of this application.

A same group of STAs that can perform packet concurrency are associated with different APs. Therefore, as shown in FIG. 10, the network device allocates, from the channel resource in the first time period, a same time resource slice to the same group of STAs that can perform packet concurrency.

In a sixth manner, a channel resource includes a time resource and a frequency resource, and when STAs that can perform packet concurrency include one STA, time resource slices allocated to STAs associated with a same AP are different, and frequency resource slices allocated to STAs that are associated with different APs and that belong to a same time resource slice are different.

For example, as shown in Table 4, a packet concurrency status of the plurality of STAs is shown in Table 4. The STA 11, the STA 12, and the STA 13 are associated with the AP 1, the STA 21, the STA 22, and the STA 23 are associated with the AP 2, and the STA 31, the STA 32, and the STA 33 are associated with the AP 3.

TABLE 4

| Packet concurrency status | STA |
| --- | --- |
| Cannot perform packet concurrency with another STA | STA 11 |
| Cannot perform packet concurrency with another STA | STA 12 |
| Cannot perform packet concurrency with another STA | STA 13 |
| Cannot perform packet concurrency with another STA | STA 21 |
| Cannot perform packet concurrency with another STA | STA 22 |
| Cannot perform packet concurrency with another STA | STA 23 |
| Cannot perform packet concurrency with another STA | STA 31 |

TABLE 4-continued

| Packet concurrency status | STA |
| --- | --- |
| Cannot perform packet concurrency with another STA | STA 32 |
| Cannot perform packet concurrency with another STA | STA 33 |

Figure 11:
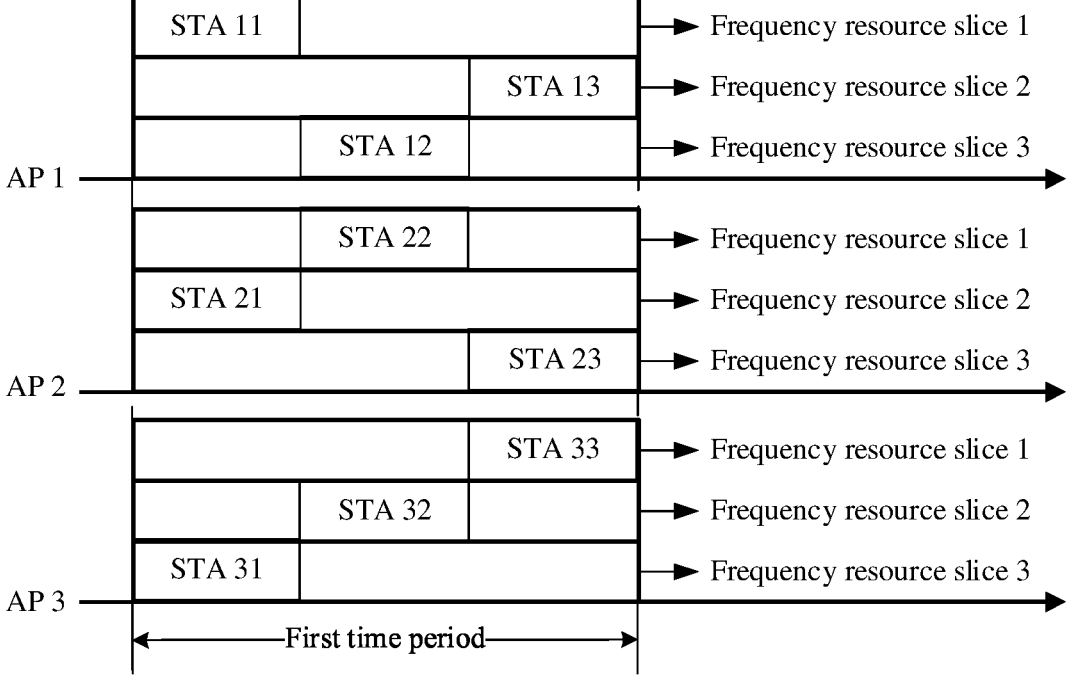
FIG. 11 is a schematic diagram of another channel resource division manner according to an embodiment of this application.

A same group of STAs that can perform packet concurrency includes only one STA. Therefore, as shown in FIG. 11, the network device allocates, from the channel resource in the first time period, different time resource slices to STAs associated with a same AP and different frequency resource slices to STAs that are associated with different APs and that belong to a same time resource slice.

The foregoing content is that the network device allocates the channel resource slices to the plurality of WLAN devices from the channel resource in the first time period. In addition, channel resource slices allocated to WLAN devices that can perform packet concurrency in the first time period are the same, and channel resource slices allocated to WLAN devices that cannot perform packet concurrency in the first time period are different. In other words, channel resource slices are allocated to these WLAN devices in a same time period. However, in some cases, channel resource slices can be further allocated to WLAN devices that cannot perform packet concurrency in different time periods. For example, the plurality of WLAN devices further include a seventh WLAN device. The seventh WLAN device, the first WLAN device, and the second WLAN device each are associated with a different WLAN device. The packet concurrency status indicates that the first WLAN device and the seventh WLAN device can perform packet concurrency, and the second WLAN device and the seventh WLAN device cannot perform packet concurrency. In this case, the network device allocates, based on the packet concurrency status, channel resource slices to the first WLAN device and the seventh WLAN device from a channel resource in a second time period. The first time period is different from the second time period, and the channel resource slices allocated to the first WLAN device and the seventh WLAN device in the second time period are the same.

Because the packet concurrency status indicates that the first WLAN device and the seventh WLAN device can perform packet concurrency, and the second WLAN device and the seventh WLAN device cannot perform packet concurrency, the network device allocates a same channel resource slice to the first WLAN device and the second WLAN device from the channel resource in the first time period, and allocates a same channel resource slice to the first WLAN device and the seventh WLAN device from the channel resource in the second time period. In this way, for the second WLAN device and the seventh WLAN device that cannot perform packet concurrency, channel resource slices allocated by the network device to the two WLAN devices are located in different time periods, so that the two WLAN devices are isolated in terms of time resources, to ensure that the two WLAN devices do not interfere with each other when sending packets.

Optionally, the first time period and the second time period are located in two different periodicities. In other words, for the second WLAN device and the seventh WLAN device that cannot perform packet concurrency, the channel resource slices allocated by the network device to the two WLAN devices are located in different periodicities, so that the two WLAN devices are isolated in terms of time resources.

It should be noted that, when the network device allocates a same channel resource slice to the first WLAN device and the second WLAN device from the channel resource in the first time period, the network device may further allocate a channel resource slice different from that of the first WLAN device and the second WLAN device to the seventh WLAN device. When the network device allocates a same channel resource slice to the first WLAN device and the seventh WLAN device from the channel resource in the second time period, the network device may also allocate a channel resource slice different from that of the first WLAN device and the seventh WLAN device to the second WLAN device. This ensures that each WLAN device has a chance to send packets in each periodicity without interference.

After allocating the channel resource slices to the plurality of WLAN devices, the network device needs to notify the plurality of WLAN devices of a channel resource allocation result, to indicate the plurality of WLAN devices to transmit packets based on the channel resource slices allocated by the network device. In addition, based on the foregoing description, the network device may be an AP, or may be a WLAN controller, or may be another computing device. Therefore, descriptions are separately provided below.

The network device is an AP. In this case, when the network device is a third WLAN device, the first WLAN device is associated with the third WLAN device, and the second WLAN device is associated with a fourth WLAN device, the third WLAN device sends a corresponding resource allocation result to the fourth WLAN device. The resource allocation result indicates a channel resource slice allocated to the second WLAN device. In this way, the third WLAN device can schedule the first WLAN device based on a channel resource slice allocated to the first WLAN device, and the fourth WLAN device can schedule the second WLAN device based on the channel resource slice allocated to the second WLAN device.

The network device is a WLAN controller or another computing device. In this case, when the first WLAN device is associated with a third WLAN device and the second WLAN device is associated with a fourth WLAN device, the network device notifies the third WLAN device of a channel resource slice allocated to the first WLAN device, and the network device notifies the fourth WLAN device of a channel resource slice allocated to the second WLAN device.

In an access periodicity of a channel, not only a data packet needs to be transmitted between an AP and a STA, but also some management frames may need to be transmitted. However, the data packet usually needs to be transmitted based on a channel resource slice allocated in a time period in which resource slicing can be performed, for example, the first time period and the second time period, and the management frame usually needs to be transmitted through free contention. In other words, the access periodicity of the channel includes a time period for resource slicing and a time period for free contention. Therefore, before allocating channel resource slices to the plurality of WLAN devices in the foregoing manner, the network device further needs to determine, within the access periodicity of the channel, a time length of a time period in which resource slicing can be performed. The following uses the first time period as an example for description.

The network device obtains a periodicity length and a time division proportion of an access periodicity of the channel. The time division proportion indicates a proportion of a time period in which resource slicing can be performed in the periodicity length. The network device determines a time length of the first time period based on the periodicity length of the access periodicity of the channel and the time division proportion.

The time division proportion may be a proportion of a time period for resource slicing in the access periodicity of the channel, or may be a proportion of a time period for non-resource slicing in the access periodicity of the channel. When the time division proportion is the proportion of the time period for resource slicing in the access periodicity of the channel, the network device multiplies the periodicity length of the access periodicity of the channel by the time division proportion, to obtain the time length of the first time period. When the time division proportion is the proportion of the time period for non-resource slicing in the access periodicity of the channel, the network device multiplies the periodicity length of the access periodicity of the channel by the time division proportion, to obtain the time length of the time period for non-resource slicing, and then subtracts the time length for non-resource slicing from the periodicity length, to obtain the time length of the first time period.

Figure 12:
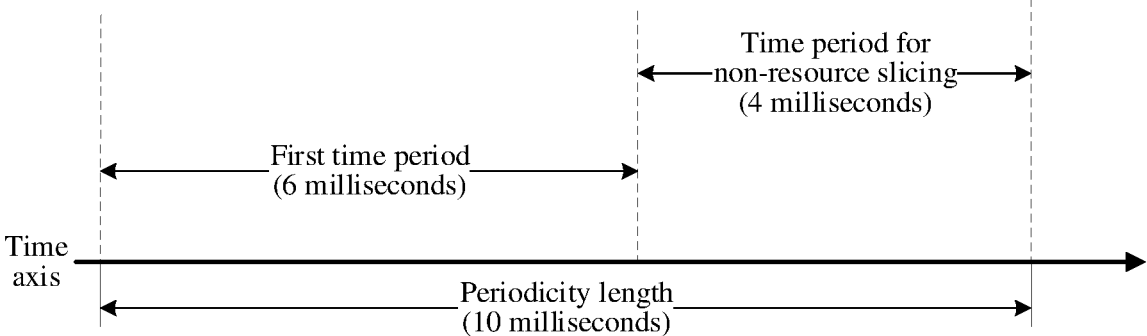
FIG. 12 is a schematic diagram of a time length of a first time period according to an embodiment of this application.

For example, the periodicity length of the access periodicity of the channel obtained by the network device is 10 milliseconds, and the time division proportion is a proportion of a time period of a resource slice in the access periodicity. It is assumed that the proportion is 60%. In this case, as shown in FIG. 12, the network device determines that the time length of the first time period is $10 \times 60\% = 6$ milliseconds.

For another example, the periodicity length of the channel access periodicity obtained by the network device is 10 milliseconds, and the time division proportion is a proportion of the time period for non-resource slicing in the access periodicity. It is assumed that the proportion is 25%. In this case, the network device determines that the time length of the time period for non-resource slicing is $10 \times 25\% = 2.5$ milliseconds, and the time length of the first time period is $10-2.5 = 7.5$ milliseconds.

It should be noted that, the time division proportion is preset, and in actual application, the time division proportion can be further adjusted according to different requirements.

The first WLAN device and the second WLAN device can perform packet concurrency, and it indicates that interference is minimum when the first WLAN device and the second WLAN device simultaneously transmit packets. Therefore, the network device allocates a same channel resource slice to the two WLAN devices from the channel resource in the first time period. The fifth WLAN device and the sixth WLAN device cannot perform packet concurrency, and it indicates that interference may be large when the fifth WLAN device and the sixth WLAN device simultaneously transmit packets. Therefore, the network device allocates different channel resource slices to the two WLAN devices from the channel resource in the first time period. In addition, the first WLAN device and the second WLAN device are associated with different WLAN devices, and the fifth WLAN device and the sixth WLAN device are associated with different WLAN devices. Therefore, after the same channel resource slice is allocated to the first WLAN device and the second WLAN device, and the different channel resource slices are allocated to the fifth WLAN device and the sixth WLAN device, it can be ensured that no large interference is caused to each other during packet transmission, and packet transmission quality is not affected. In addition, it can be ensured that all WLAN devices associated with different WLAN devices can access a channel in a timely manner, to ensure a deterministic latency of each WLAN device. In addition, according to the method in this embodiment of this application, the packet concurrency status can be further determined based on the decision-making region information and the packet measurement result. The method can further reduce a calculation amount of determining the packet concurrency status based on the packet measurement result by the network device, and can also avoid a problem that an error occurs in determining the packet concurrency status based on only the decision-making region information, to further improve accuracy of determining the packet concurrency status.

Figure 13:
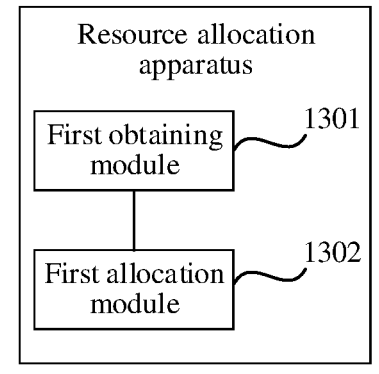
FIG. 13 is a schematic diagram of a structure of a resource allocation apparatus according to an embodiment of this application.

FIG. 13 is a schematic diagram of a structure of a resource allocation apparatus according to an embodiment of this application. The resource allocation apparatus may be implemented as a part or all of a network device by using software, hardware, or a combination thereof. As shown in FIG. 13, the apparatus includes a first obtaining module 1301 and a first allocation module 1302.

The first obtaining module 1301 is configured to obtain a packet concurrency status of a plurality of WLAN devices. The plurality of WLAN devices correspond to a same channel. For a detailed implementation process, refer to corresponding content in the foregoing embodiments. Details are not described herein again.

The first allocation module 1302 is configured to allocate channel resource slices to the plurality of WLAN devices from a channel resource in a first time period based on the packet concurrency status. The plurality of WLAN devices include a first WLAN device and a second WLAN device, the first WLAN device and the second WLAN device are associated with different WLAN devices, the packet concurrency status indicates that the first WLAN device and the second WLAN device can perform packet concurrency, and channel resource slices allocated to the first WLAN device and the second WLAN device are the same. For a detailed implementation process, refer to corresponding content in the foregoing embodiments. Details are not described herein again.

Optionally, the network device is a third WLAN device, the first WLAN device is associated with the third WLAN device, and the second WLAN device is associated with a fourth WLAN device. The apparatus further includes:

a sending module, configured to send a corresponding resource allocation result to the fourth WLAN device, where the resource allocation result indicates a channel resource slice allocated to the second WLAN device.

Optionally, the first WLAN device is associated with a third WLAN device, and the second WLAN device is associated with a fourth WLAN device. The apparatus further includes:

a first notification module, configured to notify the third WLAN device of a channel resource slice allocated to the first WLAN device; and a second notification module, configured to notify the fourth WLAN device of a channel resource slice allocated to the second WLAN device.

Optionally, the plurality of WLAN devices further include a fifth WLAN device and a sixth WLAN device. The fifth WLAN device and the sixth WLAN device are associated with different WLAN devices. The packet concurrency status indicates that the fifth WLAN device and the sixth WLAN device cannot perform packet concurrency, and channel resource slices allocated to the fifth WLAN device and the sixth WLAN device are different.

Optionally, the plurality of WLAN devices further include a seventh WLAN device, the seventh WLAN device, the first WLAN device, and the second WLAN device each are associated with a different WLAN device. The packet concurrency status indicates that the first WLAN device and the seventh WLAN device can perform packet concurrency, and the second WLAN device and the seventh WLAN device cannot perform packet concurrency. The apparatus further includes:

a second allocation module, configured to allocate channel resource slices to the first WLAN device and the seventh WLAN device from a channel resource in a second time period based on the packet concurrency status, where the first time period is different from the second time period, and the channel resource slices allocated to the first WLAN device and the seventh WLAN device in the second time period are the same.

Optionally, the first obtaining module is specifically configured to:

obtain decision-making region information, where the decision-making region information indicates a status of mutual sensing between every two WLAN devices in the plurality of WLAN devices and WLAN devices associated with the plurality of WLAN devices; and determine the packet concurrency status based on the decision-making region information.

Optionally, the first obtaining module is specifically configured to:

obtain a packet measurement result, where the packet measurement result includes signal strengths that can be sensed between every two WLAN devices in the plurality of WLAN devices and WLAN devices associated with the plurality of WLAN devices; and determine the packet concurrency status based on the packet measurement result.

Optionally, the apparatus further includes:

a second obtaining module, configured to obtain a periodicity length and a time division proportion of an access periodicity of the channel, where the time division proportion indicates a proportion of a time period in which resource slicing can be performed in the periodicity length; and a first determining module, configured to determine a time length of the first time period based on the periodicity length and the time division proportion.

In this embodiment of this application, the first WLAN device and the second WLAN device can perform packet concurrency, and it indicates that interference is minimum when the first WLAN device and the second WLAN device simultaneously transmit packets. Therefore, the network device allocates a same channel resource slice to the two WLAN devices from the channel resource in the first time period. The fifth WLAN device and the sixth WLAN device cannot perform packet concurrency, and it indicates that interference may be large when the fifth WLAN device and the sixth WLAN device simultaneously transmit packets. Therefore, the network device allocates different channel resource slices to the two WLAN devices from the channel resource in the first time period. In addition, the first WLAN device and the second WLAN device are associated with different WLAN devices, and the fifth WLAN device and the sixth WLAN device are associated with different WLAN devices. Therefore, after the same channel resource slice is allocated to the first WLAN device and the second WLAN device, and the different channel resource slices are allocated to the fifth WLAN device and the sixth WLAN device, it can be ensured that no large interference is caused to each other during packet transmission, and packet transmission quality is not affected. In addition, it can be ensured that all WLAN devices associated with different WLAN devices can access a channel in a timely manner, to ensure a deterministic latency of each WLAN device. In addition, according to the method in this embodiment of this application, the packet concurrency status can be further determined based on the decision-making region information and the packet measurement result. The method can further reduce a calculation amount of determining the packet concurrency status based on the packet measurement result by the network device, and can also avoid a problem that an error occurs in determining the packet concurrency status based on only the decision-making region information, to further improve accuracy of determining the packet concurrency status.

It should be noted that when the resource allocation apparatus provided in the foregoing embodiment performs resource allocation, division into the foregoing functional modules is merely used as an example for description. In actual application, the foregoing functions may be allocated to different functional modules for implementation according to a requirement. That is, an internal structure of the apparatus is divided into different functional modules to implement all or some of the functions described above. In addition, the resource allocation apparatus provided in the foregoing embodiment and the resource allocation method embodiment belong to a same concept. For a specific implementation process of the resource allocation apparatus, refer to the method embodiment. Details are not described herein again.

Figure 14:
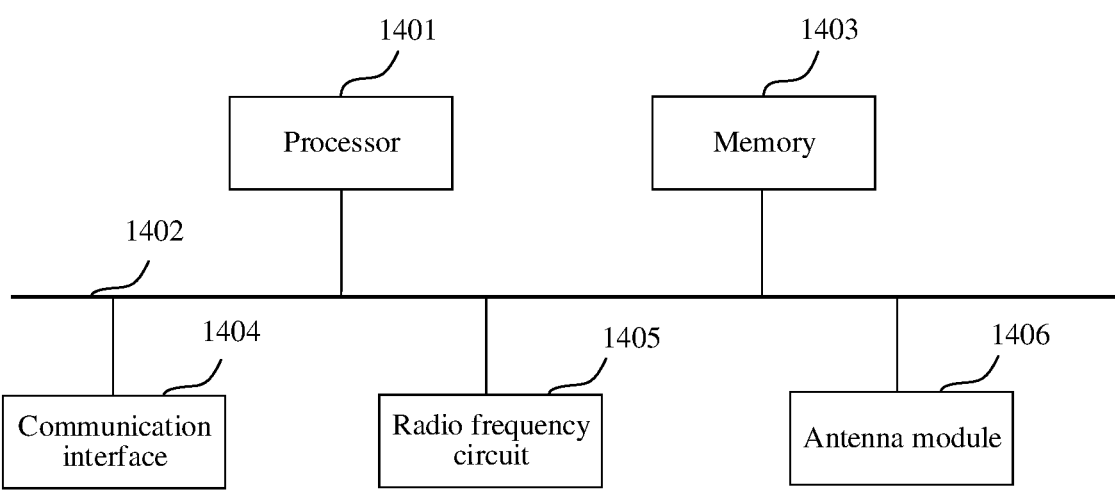
FIG. 14 is a schematic diagram of a structure of a network device according to an embodiment of this application.

FIG. 14 is a schematic diagram of a structure of a network device according to an embodiment of this application. The network device may be the network device in any one of the foregoing embodiments. The network device includes a processor 1401, and the processor 1401 is configured to obtain a packet concurrency status of a plurality of WLAN devices, and allocate channel resource slices to the plurality of WLAN devices based on the packet concurrency status of the plurality of WLAN devices. Optionally, the network device further includes a communication bus 1402, a memory 1403, a communication interface 1404, a radio frequency circuit 1405, and an antenna module 1406.

The processor 1401 may be a general-purpose central processing unit (central processing unit, CPU), a network processor (network processor, NP), a microprocessor, or one or more integrated circuits configured to implement the solution of this application, for example, an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The communication bus 1402 is configured to transfer information between the components. The communication bus 1402 may be classified into an address bus, a data bus, a control bus, and the like. For ease of representation, only one thick line is used to represent the bus in the figure, but this does not mean that there is only one bus or only one type of bus.

The memory 1403 may be a read-only memory (read-only memory, ROM), or may be a random access memory (random access memory, RAM), or may be an electrically erasable programmable read-only memory (electrically erasable programmable read-only Memory, EEPROM), an optical disc (including a compact disc read-only memory (compact disc read-only memory, CD-ROM), a compact disc, a laser disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. This is not limited thereto. The memory 1403 may exist independently, and is connected to the processor 1401 through the communication bus 1402. Alternatively, the memory 1403 may be integrated with the processor 1401.

The communication interface 1404 is configured to communicate with another device or a communication network. The communication interface 1404 includes a wired communication interface, and may further include a wireless communication interface. The wired communication interface may be, for example, an Ethernet interface. The Ethernet interface may be an optical interface, an electrical interface, or a combination thereof. The wireless communication interface may be, for example, a wireless local area network (wireless local area networks, WLAN) interface, a cellular network communication interface, or a combination thereof.

The radio frequency circuit 1405 is configured to cooperate with the antenna module 1406 to receive and transmit an RF (Radio Frequency, radio frequency) signal. The RF signal is also referred to as an electromagnetic signal. The radio frequency circuit 1405 communicates with a communication network and another communication device via the electromagnetic signal. The radio frequency circuit 1405 converts an electrical signal into an electromagnetic signal, and then sends the electromagnetic signal through the antenna module 1406, or converts an electromagnetic signal received by the antenna module 1406 into an electrical signal.

In some embodiments, the memory 1403 is configured to store program code for executing the solutions of this application, and the processor 1401 may execute the program code stored in the memory 1403. The program code may include one or more software modules. The network device may implement, by using the processor 1401 and the program code in the memory 1403, the resource allocation method provided in the embodiment in FIG. 5.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (digital versatile disc, DVD)), a semiconductor medium (for example, a solid state disk (solid state disk, SSD)), or the like. It should be noted that the computer-readable storage medium in embodiments of this application may be a non-volatile storage medium, or in other words, may be a non-transitory storage medium.

It should be understood that "at least one" in this specification means one or more. "A plurality of" in this specification means two or at least two. In the descriptions of embodiments of this application, unless otherwise specified, "I" means "or". For example, A/B may represent A or B. In this specification, "and/or" describes only an association relationship between associated objects and represents that three relationships may exist. For example, A and/or B may represent the following three cases: Only A exists, both A and B exist, and only B exists.

In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

It should be noted that information (including but not limited to user equipment information, user personal information, and the like), data (including but not limited to data used for analysis, stored data, displayed data, and the like), and signals in embodiments of this application are all authorized by a user or fully authorized by all parties, and collection, use, and processing of related data need to comply with related laws, regulations, and standards of related countries and regions. For example, in embodiments of this application, the decision-making region information, the packet measurement result, the packet concurrency status of the WLAN devices, and the periodicity length and the time division proportion of the access periodicity of the channel are all obtained when fully authorized.

The foregoing descriptions are merely embodiments of this application, but are not intended to limit this application. Any modification, equivalent replacement, or improvement made without departing from the principle of this application should fall within the protection scope of this application.

What is claimed is:

1. A method, comprising:
obtaining, by a network device, a packet concurrency status of a plurality of wireless local area network (WLAN) devices, wherein the plurality of WLAN devices correspond to a same channel; and
allocating, by the network device, channel resource slices to the plurality of WLAN devices from a channel resource in a first time period based on the packet concurrency status, wherein each of the channel resource slices is a portion of the channel resource in at least one of the time domain or the frequency domain, the plurality of WLAN devices comprise a first WLAN device and a second WLAN device, the first WLAN device and the second WLAN device are associated with different access points (APs), the different APs are co-channel APs, the packet concurrency status indicates that the first WLAN device and the second WLAN device can perform packet concurrency, and a same channel resource slice is allocated to the first WLAN device and the second WLAN device.

2. The method according to claim 1, wherein the network device is a third WLAN device, the first WLAN device is associated with the third WLAN device, and the second WLAN device is associated with a fourth WLAN device; and
after allocating, by the network device, the channel resource slices to the plurality of WLAN devices from the channel resource in the first time period based on the packet concurrency status, the method further comprises:
sending, by the third WLAN device, a resource allocation result to the fourth WLAN device, wherein the resource allocation result indicates the same channel resource slice allocated to the second WLAN device.

3. The method according to claim 1, wherein the first WLAN device is associated with a third WLAN device, and the second WLAN device is associated with a fourth WLAN device; and
wherein after allocating, by the network device, the channel resource slices to the plurality of WLAN devices from the channel resource in the first time period based on the packet concurrency status, the method further comprises:
notifying, by the network device, the third WLAN device of the same channel resource slice allocated to the first WLAN device; and
notifying, by the network device, the fourth WLAN device of the same channel resource slice allocated to the second WLAN device.

4. The method according to claim 1, wherein the plurality of WLAN devices further comprises a fifth WLAN device and a sixth WLAN device, the fifth WLAN device and the sixth WLAN device are associated with different APs, the packet concurrency status indicates that the fifth WLAN device and the sixth WLAN device cannot perform packet concurrency, and channel resource slices allocated to the fifth WLAN device and the sixth WLAN device are different.

5. The method according to claim 1, wherein the plurality of WLAN devices further comprises a seventh WLAN device, wherein the seventh WLAN device, the first WLAN device, and the second WLAN device each are associated with a different AP, and the packet concurrency status indicates that the first WLAN device and the seventh WLAN device can perform packet concurrency and the second WLAN device and the seventh WLAN device cannot perform packet concurrency; and
wherein after allocating, by the network device, the channel resource slices to the plurality of WLAN devices from the channel resource in the first time period based on the packet concurrency status, the method further comprises:
allocating, by the network device, channel resource slices to the first WLAN device and the seventh WLAN device from a channel resource in a second time period based on the packet concurrency status, wherein the first time period is different from the second time period, and the channel resource slices allocated to the first WLAN device and the seventh WLAN device in the second time period are the same.

6. The method according to claim 1, wherein obtaining, by the network device, the packet concurrency status of the plurality of WLAN devices comprises:
obtaining, by the network device, decision-making region information, wherein the decision-making region information indicates a status of mutual sensing between every two WLAN devices in the plurality of WLAN devices and WLAN devices associated with the plurality of WLAN devices; and determining, by the network device, the packet concurrency status based on the decision-making region information.

7. The method according to claim 1, wherein obtaining, by the network device, the packet concurrency status of the plurality of WLAN devices comprises:

obtaining, by the network device, a packet measurement result, wherein the packet measurement result comprises signal strengths that are sensed between every two WLAN devices in the plurality of WLAN devices and WLAN devices associated with the plurality of WLAN devices; and determining, by the network device, the packet concurrency status based on the packet measurement result.

8. The method according to claim 1, wherein before allocating, by the network device, the channel resource slices to the plurality of WLAN devices from the channel resource in the first time period based on the packet concurrency status, the method further comprises:

obtaining, by the network device, a period length and a time division proportion of an access period of the same channel, wherein the time division proportion indicates a proportion of a time period in which resource slicing can be performed in the period length; and determining, by the network device, a time length of the first time period based on the period length and the time division proportion.

9. A network device, comprising:

at least one memory; and at least one processor; and wherein the at least one memory is configured to store a computer program, when executed by the at least one processor, causing the network device to:

obtain a packet concurrency status of a plurality of wireless local area network (WLAN) devices, wherein the plurality of WLAN devices correspond to a same channel; and allocate channel resource slices to the plurality of WLAN devices from a channel resource in a first time period based on the packet concurrency status, wherein each of the channel resource slices is a portion of the channel resource in at least one of the time domain or the frequency domain, the plurality of WLAN devices comprise a first WLAN device and a second WLAN device, the first WLAN device and the second WLAN device are associated with different access point (APs), the different APs are co-channel APs, the packet concurrency status indicates that the first WLAN device and the second WLAN device can perform packet concurrency, and a same channel resource slice is allocated to the first WLAN device and the second WLAN device.

10. The network device according to claim 9, wherein the network device is a third WLAN device, the first WLAN device is associated with the third WLAN device, and the second WLAN device is associated with a fourth WLAN device; and wherein executing the computer program further causes the network device to:

after allocating the channel resource slices to the plurality of WLAN devices from the channel resource in the first time period based on the packet concurrency status, send a resource allocation result to the fourth WLAN device, wherein the resource allocation result indicates the same channel resource slice allocated to the second WLAN device.

11. The network device according to claim 9, wherein the first WLAN device is associated with a third WLAN device, and the second WLAN device is associated with a fourth WLAN device; and wherein executing the computer program further causes the network device to:

after allocating the channel resource slices to the plurality of WLAN devices from the channel resource in the first time period based on the packet concurrency status, notify the third WLAN device of the same channel resource slice allocated to the first WLAN device; and notify the fourth WLAN device of the same channel resource slice allocated to the second WLAN device.

12. The network device according to claim 9, wherein the plurality of WLAN devices further comprises a fifth WLAN device and a sixth WLAN device, the fifth WLAN device and the sixth WLAN device are associated with different APs, the packet concurrency status indicates that the fifth WLAN device and the sixth WLAN device cannot perform packet concurrency, and channel resource slices allocated to the fifth WLAN device and the sixth WLAN device are different.

13. The network device according to claim 9, wherein the plurality of WLAN devices further comprises a seventh WLAN device, wherein the seventh WLAN device, the first WLAN device, and the second WLAN device each are associated with a different AP, and the packet concurrency status indicates that the first WLAN device and the seventh WLAN device can perform packet concurrency and the second WLAN device and the seventh WLAN device cannot perform packet concurrency; and wherein executing the computer program further causes the network device to:

after allocating the channel resource slices to the plurality of WLAN devices from the channel resource in the first time period based on the packet concurrency status, allocate channel resource slices to the first WLAN device and the seventh WLAN device from a channel resource in a second time period based on the packet concurrency status, wherein the first time period is different from the second time period, and the channel resource slices allocated to the first WLAN device and the seventh WLAN device in the second time period are the same.

14. A non-transitory computer-readable storage medium, wherein the non-transitory computer-readable storage medium stores instructions, and when the instructions are run on a computer, the computer causes a network device to:

obtain a packet concurrency status of a plurality of wireless local area network (WLAN) devices, wherein the plurality of WLAN devices correspond to a same channel; and allocate channel resource slices to the plurality of WLAN devices from a channel resource in a first time period based on the packet concurrency status, wherein each of the channel resource slices is a portion of the channel resource in at least one of the time domain or the frequency domain, the plurality of WLAN devices comprise a first WLAN device and a second WLAN device, the first WLAN device and the second WLAN device are associated with different access point (APs), the different APs are co-channel APs, the packet concurrency status indicates that the first WLAN device and the second WLAN device can perform packet concurrency, and a same channel resource slice is allocated to the first WLAN device and the second WLAN device.

15. The non-transitory computer-readable storage medium according to claim 14, wherein the network device is a third WLAN device, the first WLAN device is associated with the third WLAN device, and the second WLAN device is associated with a fourth WLAN device; and wherein when the instructions are run on the computer, the computer further causes the network device to:

after allocating the channel resource slices to the plurality of WLAN devices from the channel resource in the first time period based on the packet concurrency status, send a resource allocation result to the fourth WLAN device, wherein the resource allocation result indicates a channel resource slice allocated to the second WLAN device.

16. The non-transitory computer-readable storage medium according to claim 14, wherein the first WLAN device is associated with a third WLAN device, and the second WLAN device is associated with a fourth WLAN device; and wherein when the instructions are run on the computer, the computer further causes the network device to:

after allocating the channel resource slices to the plurality of WLAN devices from the channel resource in the first time period based on the packet concurrency status, notify the third WLAN device of a channel resource slice allocated to the first WLAN device; and notify the fourth WLAN device of a channel resource slice allocated to the second WLAN device.

17. The non-transitory computer-readable storage medium according to claim 14, wherein the plurality of WLAN devices further comprises a fifth WLAN device and a sixth WLAN device, the fifth WLAN device and the sixth WLAN device are associated with different APs, the packet concurrency status indicates that the fifth WLAN device and the sixth WLAN device cannot perform packet concurrency, and channel resource slices allocated to the fifth WLAN device and the sixth WLAN device are different.

18. The non-transitory computer-readable storage medium according to claim 14, wherein the plurality of WLAN devices further comprises a seventh WLAN device, wherein the seventh WLAN device, the first WLAN device, and the second WLAN device each are associated with a different AP, and the packet concurrency status indicates that the first WLAN device and the seventh WLAN device can perform packet concurrency and the second WLAN device and the seventh WLAN device cannot perform packet concurrency; and wherein when the instructions are run on the computer, the computer further causes the network device to:

after allocating the channel resource slices to the plurality of WLAN devices from the channel resource in the first time period based on the packet concurrency status, allocate channel resource slices to the first WLAN device and the seventh WLAN device from a channel resource in a second time period based on the packet concurrency status, wherein the first time period is different from the second time period, and the channel resource slices allocated to the first WLAN device and the seventh WLAN device in the second time period are the same.

19. The non-transitory computer-readable storage medium according to claim 14, wherein obtaining the packet concurrency status of the plurality of WLAN devices comprises:

obtaining decision-making region information, wherein the decision-making region information indicates a status of mutual sensing between every two WLAN devices in the plurality of WLAN devices and WLAN devices associated with the plurality of WLAN devices; and determining the packet concurrency status based on the decision-making region information.

20. The non-transitory computer-readable storage medium according to claim 14, wherein obtaining the packet concurrency status of the plurality of WLAN devices comprises:

obtaining a packet measurement result, wherein the packet measurement result comprises signal strengths that are sensed between every two WLAN devices in the plurality of WLAN devices and WLAN devices associated with the plurality of WLAN devices; and determining the packet concurrency status based on the packet measurement result.

* * * * *